US012397231B2

(12) United States Patent
Zou et al.

(10) Patent No.: US 12,397,231 B2
(45) Date of Patent: Aug. 26, 2025

(54) INFORMATION PROCESSING METHOD, APPARATUS, AND DEVICE

(71) Applicant: TENCENT TECHNOLOGY (SHENZHEN) COMPANY LIMITED, Shenzhen (CN)

(72) Inventors: Huasong Zou, Shenzhen (CN); Yujie Mao, Shenzhen (CN); Quan Cheng, Shenzhen (CN); Haoyue Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 18/077,527

(22) Filed: Dec. 8, 2022

(65) Prior Publication Data

US 2023/0094558 A1 Mar. 30, 2023

Related U.S. Application Data

(63) Continuation of application No. PCT/CN2021/100015, filed on Jun. 15, 2021.

(30) Foreign Application Priority Data

Jul. 20, 2020 (CN) .......................... 202010699849.8

(51) Int. Cl.
 *A63F 13/537* (2014.01)
(52) U.S. Cl.
 CPC .................................. *A63F 13/537* (2014.09)
(58) Field of Classification Search
 CPC ....... A63F 13/537; A63F 13/533; A63F 13/55
 See application file for complete search history.

(56) References Cited

U.S. PATENT DOCUMENTS

| 10,015,316 | B1 * | 7/2018 | Horne | ..................... G06Q 50/01 |
| 2007/0087797 | A1 * | 4/2007 | Van Luchene | .......... A63F 13/85 |
| | | | | 463/1 |

(Continued)

FOREIGN PATENT DOCUMENTS

| CN | 103713894 A | 4/2014 |
| CN | 106100974 A | 11/2016 |

(Continued)

OTHER PUBLICATIONS

The State Intellectual Property Office of the People's Republic of China (SIPO) Office Action 1 for 202010699849.8 Nov. 14, 2023 10 Pages (including translation).

(Continued)

*Primary Examiner* — Steve Rowland
(74) *Attorney, Agent, or Firm* — Anova Law Group, PLLC

(57) ABSTRACT

This application discloses an information processing method, apparatus, and device, and relates to the field of artificial intelligence (AI). The method includes displaying a user interface, the user interface comprising a received virtual item packet, and the virtual item packet comprising topic information; displaying the topic information of the virtual item packet; receiving an interaction message corresponding to a second user account, the interaction message being matched with target information to request to receive a virtual item in the virtual item packet, and the target information being the topic information or information associated with the topic information; and receiving the virtual item in the virtual item packet in response to matching the interaction message and the target information.

19 Claims, 12 Drawing Sheets

(56) References Cited

U.S. PATENT DOCUMENTS

| | | | |
|---|---|---|---|
| 2011/0061051 A1* | 3/2011 | Haber | H04L 41/14 718/100 |
| 2013/0035158 A1* | 2/2013 | Osvald | A63F 13/87 463/30 |
| 2013/0231182 A1* | 9/2013 | Hall | A63F 13/795 463/31 |
| 2014/0004955 A1* | 1/2014 | Nahari | A63F 13/60 463/42 |
| 2014/0040161 A1* | 2/2014 | Berlin | G06Q 30/0282 705/347 |
| 2015/0134439 A1* | 5/2015 | Maxwell | G06Q 30/0207 705/14.1 |
| 2016/0036973 A1* | 2/2016 | Harasimiuk | H04M 3/5191 379/265.13 |
| 2017/0147996 A1* | 5/2017 | Kirley | H04L 12/1822 |
| 2018/0357729 A1* | 12/2018 | Farnham | G06Q 30/0279 |
| 2019/0043064 A1* | 2/2019 | Chin | G06Q 30/0201 |
| 2019/0370844 A1* | 12/2019 | Miller | G06Q 30/0218 |
| 2020/0035244 A1* | 1/2020 | Kim | G06F 40/30 |
| 2020/0250574 A1* | 8/2020 | Khazane | G06N 3/006 |
| 2021/0142387 A1* | 5/2021 | Gupta | G06Q 30/0217 |

FOREIGN PATENT DOCUMENTS

| | | |
|---|---|---|
| CN | 107343030 A | 11/2017 |
| CN | 107730261 A | 2/2018 |
| CN | 109325748 A | 2/2019 |
| CN | 109325784 A | 2/2019 |
| CN | 110084579 A | 8/2019 |
| CN | 110163584 A | 8/2019 |
| CN | 112749956 A | 5/2021 |
| WO | 2019174073 A1 | 9/2019 |

OTHER PUBLICATIONS

The World Intellectual Property Organization (WIPO) International Search Report for PCT/CN2021/100015 Sep. 13, 2021 6 Pages (including translation).

China National Intellectual Property Administration (CNIPA) Office Action 1 for 202010699849.8 Jun. 20, 2024 10 Pages (including translation).

* cited by examiner

Praise me pretty

INFORMATION PROCESSING METHOD, APPARATUS, AND DEVICE

RELATED APPLICATIONS

This application is a continuation application of PCT Application No. PCT/CN2021/100015, filed on Jun. 15, 2021, which in turn claims priority to Chinese Patent Application No. 202010699849.8, entitled "INFORMATION PROCESSING METHOD, APPARATUS, AND DEVICE" and filed with the China National Intellectual Property Administration on Jul. 20, 2020. The two applications are both incorporated herein by reference in their entirety.

FIELD OF THE TECHNOLOGY

This application relates to the field of artificial intelligence (AI), and in particular, to information processing technologies.

BACKGROUND OF THE DISCLOSURE

With the development of network technologies, virtual items such as equipment, a pet, and a virtual currency, have appeared in online games.

In social networking software, a user can transmit a virtual item by using a virtual item packet based on messages of other users, and another user can receive the virtual item packet to obtain the virtual item in the virtual item packet. A sender may determine, according to contents of the messages of other users (e.g., how well the contents match a preset topic), a receiver of the virtual item packet and/or a quantity of items in the virtual item packet. However, such determination may vary due to subjectivity of the sender and may not be consistent for messages of similar contents. An automated determination based on keyword recognition can be applied. However, simple keyword recognition lacks flexibility and may produce inaccurate determination outcome. For example, in a topic of "complimenting my look", a first message may include "you have beautiful eyes" and a second message may include "he has a beautiful painting." Since both messages include same keyword "beautiful", the keyword recognition method may determine the matching degrees of both messages to be the same. However, the matching degree of the second message should be less than the first message since the complementing subject does not match the topic.

In view of the foregoing technical solution, there is a need to develop a method for receiving and transmitting the virtual item packet that provides consistent and accurate determination outcome based on natural language processing on message contents.

SUMMARY

Embodiments of this application provide an information processing method, apparatus, and device.

One aspect of this application provides an information processing method. The method is performed by a computer device. The method includes displaying a user interface, the user interface comprising a received virtual item packet, and the virtual item packet comprising topic information; displaying the topic information of the virtual item packet; receiving an interaction message corresponding to a second user account, the interaction message being matched with target information to request to receive a virtual item in the virtual item packet, and the target information being the topic information or information associated with the topic information; and receiving the virtual item in the virtual item packet in response to matching the interaction message and the target information.

Another aspect of this application provides an information processing method, performed by a computer device, and the method including receiving a virtual item packet transmission request from a first client, a first user account being logged in to the first client; transmitting a virtual item packet to a second client according to the virtual item packet transmission request, the virtual item packet comprising topic information; obtaining an interaction message corresponding to a second user account, the second user account being an account logged in to the second client; and transmitting a virtual item in the virtual item packet to the second client in response to matching the interaction message and target information, the target information being the topic information or information associated with the topic information.

Another aspect of this application provides a non-transitory computer-readable storage, storing at least one instruction, at least one program, a code set, or an instruction set, the at least one instruction, the at least one program, the code set, or the instruction set being loaded and executed by a processor to implement the information processing method according to the foregoing aspect.

DESCRIPTION OF EMBODIMENTS

To make the objectives, technical solutions, and advantages of this application clearer, the following further describes implementations of this application in detail with reference to the accompanying drawings.

First, terms described in the embodiments of this application are briefly introduced.

Virtual item: a virtual resource that can be circulated. For example, the virtual item is the virtual resource that can be exchanged for a product. For example, the virtual item may be a virtual currency, a fund, funds, shares, a game equipment, a game material, a game pet, a game coin, an icon, a member, a title, a value-added service, a point, an ingot, a golden bean, a gift certificate, an exchange coupon, a coupon, a greeting card, money, or the like.

Figure 1:
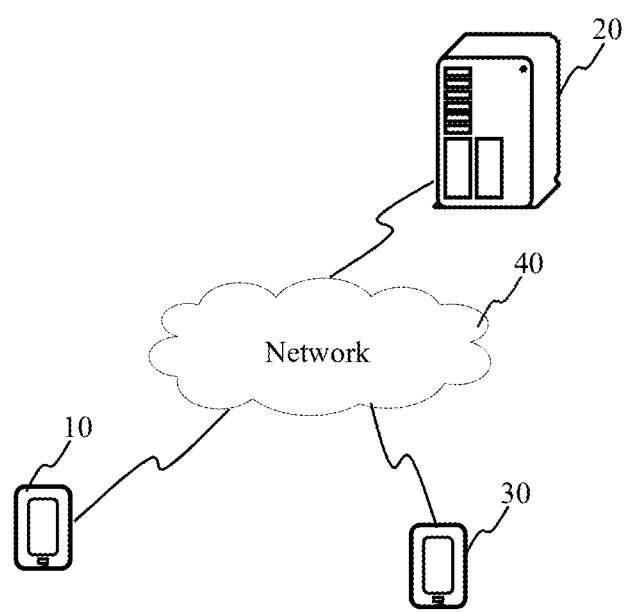
FIG. 1 is a block diagram of an implementation environment according to an embodiment of this application.

FIG. 1 is a schematic diagram of an implementation environment according to an embodiment of this application. The implementation environment may include: a first terminal 10, a server 20, and a second terminal 30.

The first terminal 10 may be a computer device such as a smart phone, a desktop computer, a tablet computer, a game console, an e-book reader, a multimedia playback device, a moving picture experts group audio layer III (MP3) player, a moving picture experts group audio layer IV (MP4) player, a laptop portable computer, or the like. A first client of an application capable of transmitting a virtual item packet may be installed in the first terminal 10, such as, a financial program, a social networking program, a shopping program, a game program, a video program, an audio program, or the like.

The second terminal 30 may be a computer device such as a smart phone, a desktop computer, a tablet computer, a game console, an e-book reader, a multimedia playback device, a wearable device, an MP3 player, an MP4 player, a laptop computer, or the like. A second client of an application capable of receiving a virtual item packet may be installed in the second terminal 30, such as, a financial program, a social networking program, a shopping program, a game program, a video program, an audio program, or the like.

The server 20 is configured to provide a background service for a client of an application (for example, an application capable of receiving a virtual item packet) in the first terminal 10 or the second terminal 30. For example, the server 20 may be a background server of the application (for example, an application capable of receiving a virtual item packet). The server 20 may be one server, a server cluster including a plurality of servers, or a cloud computing service center.

The first terminal 10, the second terminal 30, and the server 20 may communicate with each other through a network 40. The network 40 may be a wired network or a wireless network.

For example, this application provides a receiving method, a transmission method, and a processing method for a virtual item packet. This embodiment is described by using a scenario in which the method is applicable to transmitting and receiving a red envelope in a social networking program as an example.

In a social networking program, a user can allocate virtual items in a group chat or a one-to-one chat based on message contents in the group chat or one-to-one chat. For example, a topic can be set in the chat session, and participants of the chat session can send messages related to the topic. The disclosed method can be utilized to analyze matching degrees between the contents of messages and the topic based on natural language processing techniques, and to allocate the virtual items to the participants according to the matching degrees. A participant that sent a message with a higher matching degree may be allocated with a higher quantity of the virtual items or a virtual item having better characteristics/attributes than a participant that sent a message with a lower matching degree. It can be understood that the disclosed language processing methods can be used in other technical applications that involves determination of topic/content matching degrees, such as voice control applications, chat robots, etc.

In one example, the virtual items may be compliment red envelope. A first user account may transmit a compliment red envelope and a second user account may receive the compliment red envelope. For example, the user selects a piece of topic information when the user transmits the compliment red envelope, and other users receive the compliment red envelope by replying complimentary words (that is, an interaction message including complimenting words) related to the topic information. A server may perform recognition on a correlation between the compliment words replied by other users and the topic information, and the recognition is passed when the compliment words are matched with the topic information, and other users are allowed to receive the compliment red envelope. For example, when the compliment red envelope is received in a group chat environment, a weight of the amount of the compliment red envelope received by the receiving users may be determined based on a degree of matching between the complimenting words and the topic information determined by the server. The higher the degree of matching, the greater the weight.

Figure 2:
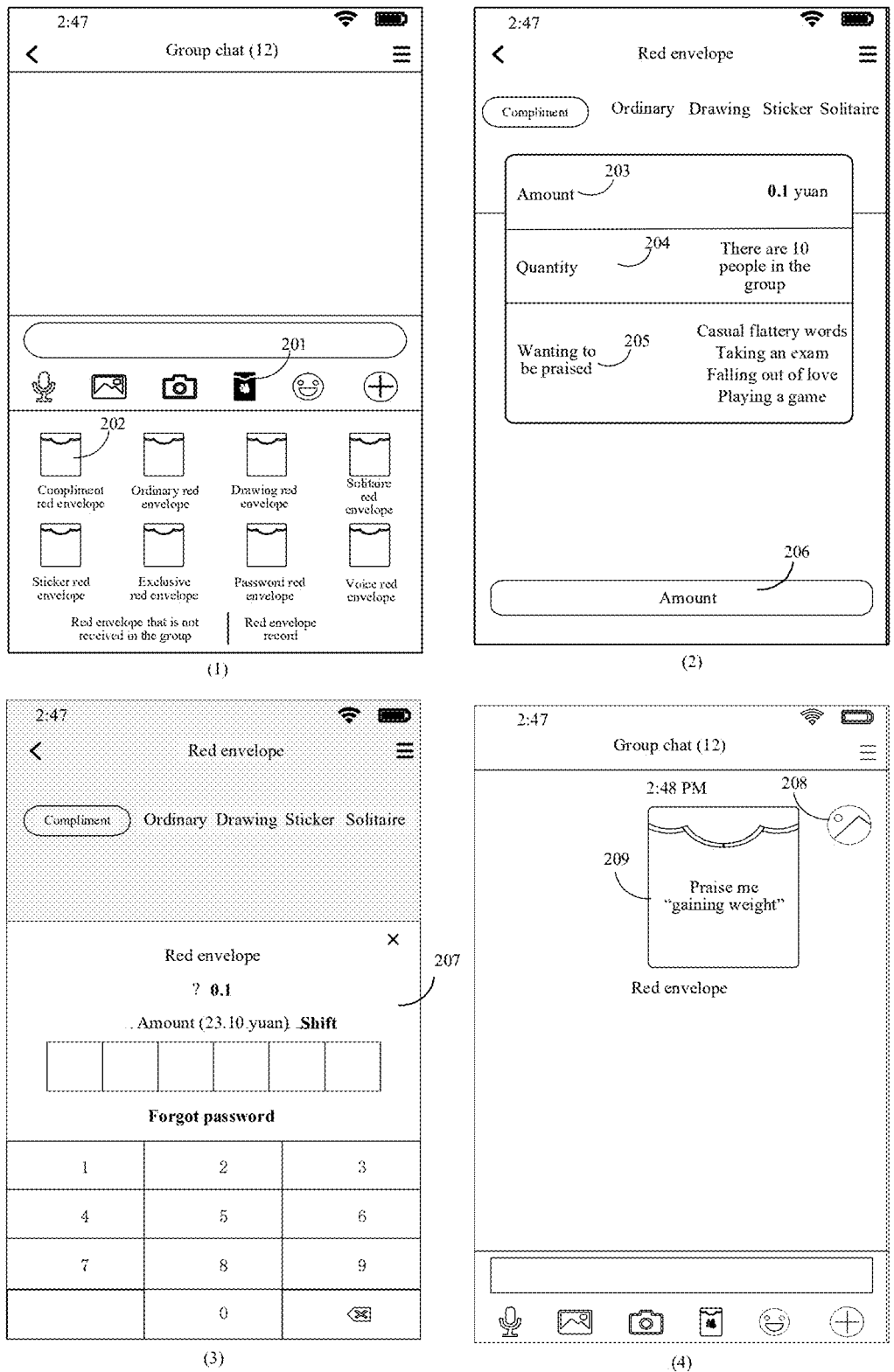
FIG. 2 is a schematic diagram of a user interface of a transmission method of a virtual item packet according to an embodiment of this application.

A transmission process of the compliment red envelope is shown in FIG. 2, a schematic diagram of a user interface corresponding to a group of first user accounts i. As shown in (1) in FIG. 2, after entering a user interface of a specific group chat, the user can click a red envelope transmitting control 201, and a red envelope selection interface is popped up. In the red envelope selection interface, the user can click the compliment red envelope 202 to enter an editing interface of the compliment red envelope. As shown in (2) in FIG. 2, the user can edit parameter information of the compliment red envelope in the user interface, for example, the number of virtual items in the red envelope 203, the number of red envelopes 204, and the topic information 205 of the compliment red envelope. For example, for the topic information 205 of the compliment red envelope, the server presets topic information of a batch of the trained AI recognition models for the user to select. For example, the user can also voluntarily choose the topic information 205 of the compliment red envelope. For example, the topic information selected by the user is: praise me "gaining weight". After completing editing the parameter information of the compliment red envelope, the user can click a transmitting control 206. For example, an "Amount" button shown in FIG. 2 can be used as the transmitting control 206 to enter a payment interface of the compliment red envelope. As shown in (3) in FIG. 2, the user can complete payment for the compliment red envelope on the payment interface 207, and jump back to the user interface of the group chat after the payment succeeds. As shown in (4) in FIG. 2, the first user account 208 transmits a compliment red envelope 209 in the group chat, and the topic information of the compliment red envelope 209 is: praise me "gaining weight". For example, a display format of the topic information displayed on the user interface is different according to different types of emotions of the topic information selected by the user. For example, topic information that is biased towards positive description: praise me "xxx", such as praise me "handsome", and topic information that is biased towards negative description: "xxx" please praise me, such as "being criticized" please praise me.

Figure 3:
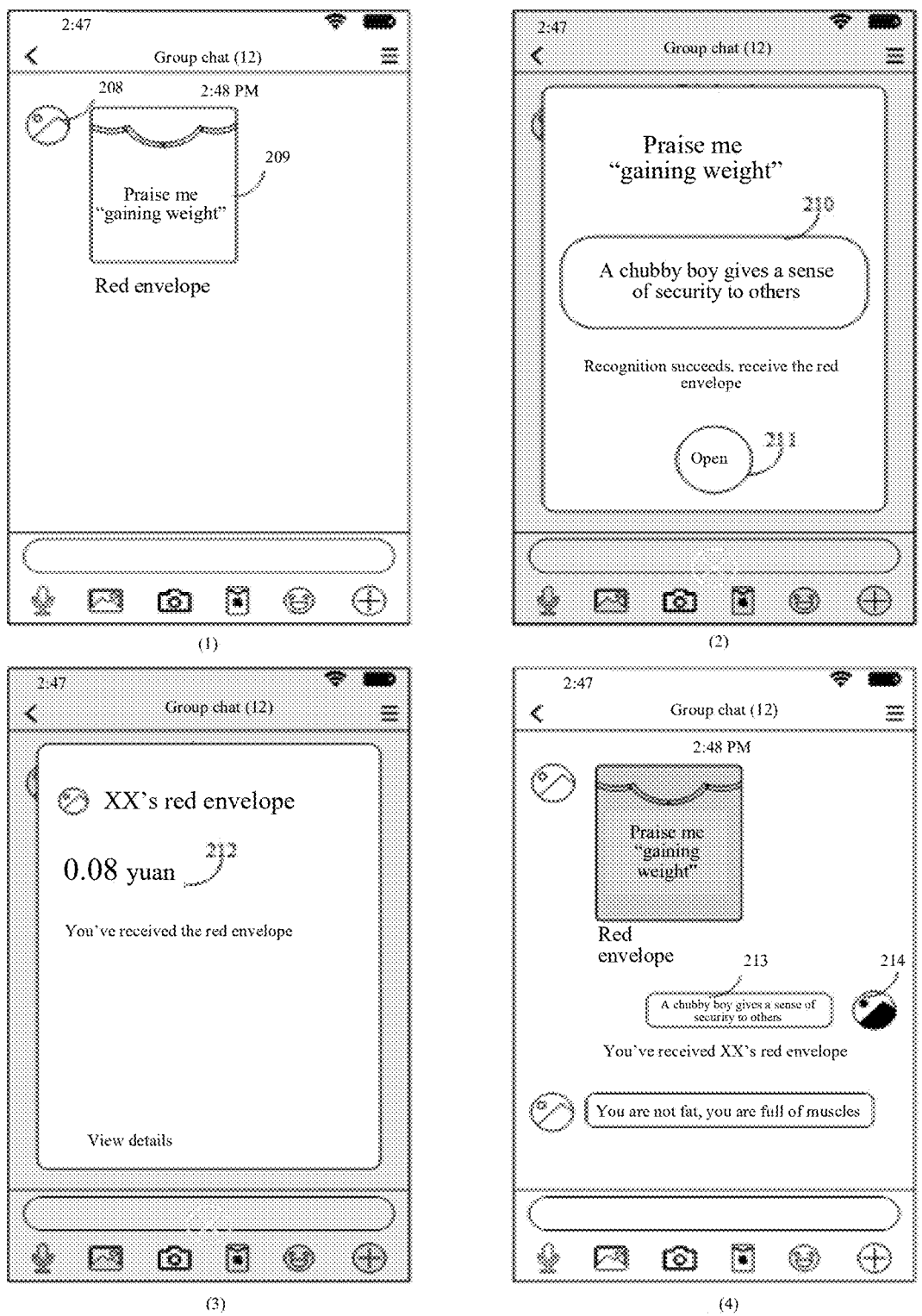
FIG. 3 is a schematic diagram of a user interface of a receiving method of a virtual item packet according to an embodiment of this application.

For a receiving process of the compliment red envelope, as shown in FIG. 3, a schematic diagram of a user interface corresponding to a group of second user accounts is given. As shown in (1) in FIG. 3, the first user account 208 transmits a compliment red envelope 209 in the group chat, and the topic information of the compliment red envelope 209 is: praise me "gaining weight". The user clicks the compliment red envelope 209, and a pre-receiving interface of the compliment red envelope can be popped up. As shown in (2) in FIG. 3, the topic information of the compliment red envelope is displayed on the pre-receiving interface, and the user needs to reply to compliment words related to the topic information. The user inputs (inputting by voice or text) compliment words 210 "a chubby boy gives a sense of security to others". For example, after an input operation performed by the user is not detected for 1 second (duration can be configured and modified), the server is triggered to perform recognition on the compliment words 210 "a chubby boy gives a sense of security to others". For example, a recognition process of the server includes first recognizing an emotional attribute of the compliment words. If the emotional attribute of the words is negative, the recognition fails. If the emotional attribute of the words is positive, the server calculates a distance between the compliment words and a topic space. When the distance is less than or equal to a threshold, it is considered that the recognition succeeds. If the recognition succeeds, "Recognition succeeds, receive the red envelope" is displayed on the pre-receiving interface to prompt the user to enter a process of grabbing the red envelope. The user can click the red envelope receiving control 211 on the pre-receiving interface to control the server to grab the red envelope. For example, after clicking the red envelope receiving control 211, the user brings information such as an identity (ID), an authentication key (authkey), and a recognition token of the red envelope to the server. The server performs information verification, and if succeeds, grabs the red envelope and feeds back the number of virtual items received from the compliment red envelope to a client. As shown in (3) in FIG. 3, after the server completes grabbing the red envelope, the client jumps to a reception success interface. The number 0.08 of the virtual item 212 received by the second user account from the compliment red envelope is displayed on the reception success interface. In addition, the second user account further transmits a compliment words message (that is, an interaction message) in the group chat. The compliment words message includes the compliment words inputted by the user, and the user can see the compliment words message on the user interface of the group chat after exiting the reception success interface. As shown in (4) in FIG. 3, the second user account 214 transmits a compliment words message 213 in the group chat. For example, the compliment words inputted by other users aiming to grab the compliment red envelope are also displayed in the group chat in the form of the compliment words message.

Figure 4:
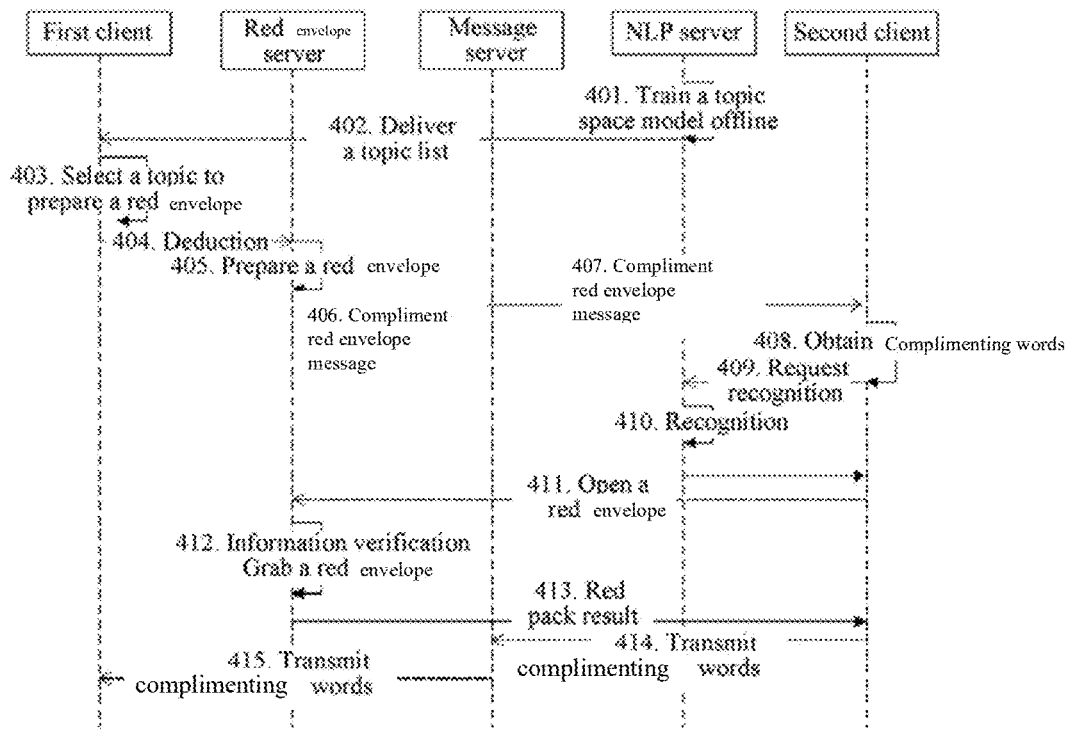
FIG. 4 is a flowchart of an information processing method according to an embodiment of this application.

For example, as shown in FIG. 4, this embodiment provides a method for information interaction between the first client corresponding to the first user account and the second client corresponding to the second user account and the server when transmitting a compliment red envelope and receiving a compliment red envelope. For example, the server includes a red envelope server, a message server, and an NLP server (natural language processing server). The red envelope server is configured to perform a logical operation in a process of transmitting and receiving the red envelope. The message server is configured to perform a logical operation in a process of transmitting and receiving a message in the social networking program. The NLP server is configured to perform recognition on the compliment words. The method includes the following steps.

Step 401. The NLP server trains s topic space model offline.

The topic space model is a recognition model corresponding to topic information, and is configured to perform recognition on whether the interaction information including the compliment words is matched with the topic information. Because there are a plurality of expressions corresponding to one piece of topic information, one piece of topic information can correspond to one topic space model. The topic space model includes a plurality of different entry points, the topic information can be expressed by different entry points.

For example, the topic information corresponding to the topic space model is obtained by performing filtering through investigation of public information on the internet in combination with the social interest preference of the user. For example, the topic information includes playing a game, taking an exam, falling out of love, or the like.

Step 402. The NLP server delivers a topic list to the first client.

The topic list includes a series of pieces of topic information on which the NLP server can perform recognition. After receiving the topic list, the first client updates topic information of a selectable compliment red envelope.

Step 403. The first client selects a topic red envelope.

The first client receives editing performed by the user on the compliment red envelope on the compliment red envelope editing interface, including the selection of the topic information. For example, the editing can further be performed on the number of red envelopes and the amount of red envelopes.

Step 404. The user corresponding to the first user account performs payment on the payment interface, and the red envelope server performs corresponding deduction.

Step 405. The red envelope server prepares the red envelope.

Step 406. The red envelope server transmits a compliment red envelope message to the message server.

Step 407. The message server transmits a compliment red envelope message to the second client.

The red envelope server calls the message server to transmit the compliment red envelope message to the second client. The compliment red envelope message may include information such as an ID of the red envelope, an authentication key (authkey), a topic, and a style of the red envelope.

Step 408. The second client obtains the compliment words.

Step 409. The second client requests recognition performed by the NLP server.

After completing inputting the compliment words, the second client requests the NLP server to perform recognition on the compliment words.

Step 410. The NLP server performs recognition.

The NLP server performs recognition on the compliment words obtained by the second client, and determines whether the compliment words are matched with the topic information. When the recognition succeeds, the NLP server feeds back a recognition result to the second client to prompt the user that the recognition succeeds, and the compliment red envelope can be received.

For example, if the recognition fails, the second client displays prompt information that the recognition fails, and prompts the user to input the compliment words again to obtain the compliment red envelope.

Step 411. The second client calls the red envelope server to open the red envelope.

The second client transmits information such as the ID of the red envelope, the authentication key (authkey), and the recognition token to the red envelope server, and requests the red envelope server to open the red envelope.

Step 412. The red envelope server performs information verification to grab the red envelope.

For example, the red envelope server generates a red envelope result after the information is proved correct after verification. For example, the red envelope result includes the number of virtual items grabbed by the second user account, and the red envelope server can determine the number of grabbed virtual items according to the degree of matching between the compliment words recognized by the topic space model and the topic information. For example, the higher the degree of matching, the more virtual items the user grabs.

Step 413. The red envelope server feeds back the red envelope result to the second client.

The red envelope result includes: the amount of the compliment red envelope received by the second client.

Step 414. The second client transmits a compliment words message to the message server.

Step 415. The message server transmits a compliment words message to the first client.

For example, based on the idea of this application, an embodiment of this application is not limited to the compliment red envelope. For example, the topic information in the compliment red envelope can further be replaced by other types of data such as a picture, an audio, and a video. In addition to inputting text, the user can further receive the virtual item packet by other manners such as inputting a voice clip, recording a video, and inputting a picture. For example, an alternative manner for the topic information and a manner for receiving the virtual item packet can be arbitrarily combined to obtain a new method for receiving the virtual item packet. Several embodiments are given below.

In an alternative embodiment, the topic information can be a picture, and the server can perform recognition on the content of the picture, so as to construct a topic space model for describing the picture. When the user inputs a voice segment for the content of the picture, the server may perform recognition on the inputted voice segment. For example, the server first converts the inputted voice segment into text, and then performs recognition on the text to determine whether the text is the compliment words for the content of the picture.

In an alternative embodiment, the topic information can further be audio, and the server can perform recognition on the content of the audio, so as to construct a topic space model for describing the audio. Another user can record a video, and the server can extract the audio from the video recorded by another user, convert the audio into text, and then perform recognition on the text to determine whether the text is the compliment words for the content of the audio of the topic information.

In summary, in the method provided in this embodiment, a compliment red envelope is provided, so that the user receives the compliment red envelope by replying to the corresponding compliment words for the topic information corresponding to the compliment red envelope. Accordingly, a manner for the user to receive the red envelope is enriched, and the user is promoted to transmit and receive the red envelope. In addition, by displaying the compliment words message on the client, the user can receive compliments from other users by transmitting the compliment red envelope, so that the interactivity of the compliment red envelope is improved.

Figure 5:
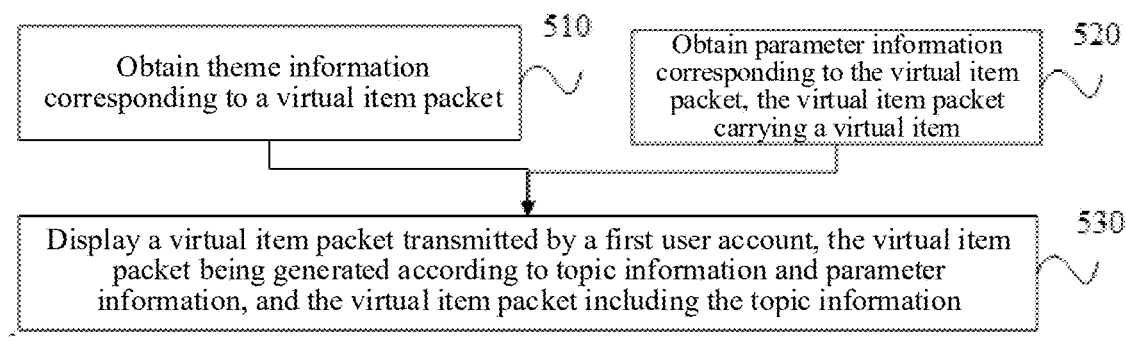
FIG. 5 is a flowchart of an information processing method according to an embodiment of this application.

FIG. 5 is a method flowchart of an information processing method according to an embodiment of this application. Using an execution entity of the method as the first client in the first terminal 10 shown in FIG. 1 as an example, the first terminal 10 runs a first client that supports transmitting the virtual item packet, that is, the computer device is the first client in this case. The method at least includes the following steps:

Step 510. Obtain topic information corresponding to a virtual item packet.

The first client obtains topic information corresponding to a virtual item packet. A first user account is logged in to the first client.

The virtual item packet is a collection of virtual items. The virtual item packet includes a virtual item, and the virtual item may be one or more, which is not limited in this embodiment. For example, the virtual item packet may be a virtual item packet, an email, an electronic gift packet, or the like.

The virtual item is a virtual resource that can be circulated. For example, the virtual item may be virtual resource that can be exchanged for a product. For example, the virtual item may be a virtual currency, a fund, funds, shares, a game equipment, a game material, a game pet, a game coin, an icon, a member, a title, a value-added service, a point, an ingot, a golden bean, a gift certificate, an exchange coupon, a coupon, a greeting card, money, or the like.

The topic information corresponds to the virtual item packet. The topic information may be used for describing a topic of the interaction message that the first user account expects to receive. The topic information may be at least one piece of text information, audio information, video information, and picture information. The interaction message is a message used for interaction between the first client and the second client. In some embodiments, the interaction message is implemented as: a chat message, a comment message, or the like.

Generally, a virtual item packet corresponds to one or more pieces of topic information. When one virtual item packet corresponds to one piece of topic information, after receiving the virtual item packet, the second user account needs to reply to an interaction message that is matched with the one piece of topic information, so as to receive the virtual item in the virtual item packet. When a virtual item packet corresponds to a plurality of pieces of topic information, after receiving the virtual item packet, the second user account needs to reply to an interaction message that is matched with at least one of the plurality of pieces of topic information, so as to receive the virtual item in the virtual item packet.

In some cases, the topic information may also include casual compliment words, that is, the first user account does not limit the topic of the interaction message expected to be received.

In one embodiment, the obtaining topic information corresponding to a virtual item packet includes: displaying a candidate topic information list, where the candidate topic information list includes candidate topic information; and receiving a selection operation on target topic information in the candidate topic information list, and using the target topic information as the topic information corresponding to the virtual item packet.

That is, the first client displays a candidate topic information list, and the user corresponding to the first user account can select one piece of candidate topic information from the provided candidate topic information list as the topic information corresponding to the virtual item packet.

Figure 6:
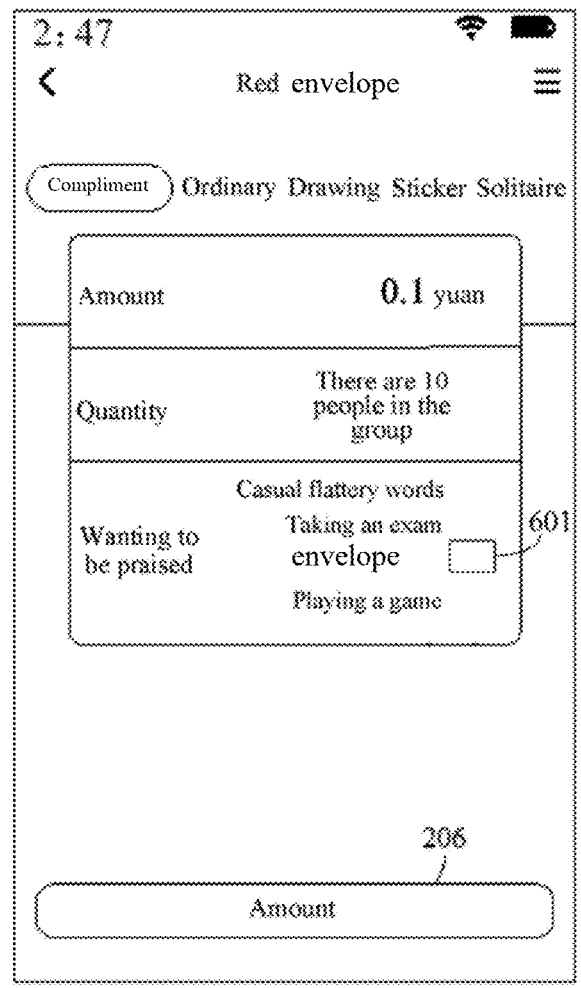
FIG. 6 is a schematic diagram of a user interface of an information processing method according to an embodiment of this application.

For example, referring to FIG. 6, on the editing interface of the virtual item packet, the first client displays candidate topic information: casual compliment words, taking an exam, falling out of love, and playing a game. The four pieces of candidate topic information form a candidate topic information list, and the user corresponding to the first user account can select from the four pieces of candidate topic information.

The candidate topic information list may be a locally stored first candidate topic information list. Correspondingly, before the displaying a candidate topic information list, the method further includes generating the candidate topic information list according to the locally stored first candidate topic information list.

For example, the user locally stores the topic information the user is interested in, and generates a first candidate topic information list.

The candidate topic information list may further be a second candidate topic information list transmitted by the server. Correspondingly, before the displaying a candidate topic information list, the method further includes generating the candidate topic information list according to the second candidate topic information list transmitted by the server.

For example, the server collects information on the network, and the big data analyzes topic information that most users may be interested in, and generates the second candidate topic information list. The server transmits the second candidate topic information list to the first client at a specific period; or the server transmits the updated second candidate topic information list to the first client when the first client requests to update the second candidate topic information list.

The candidate topic information list may further be a candidate topic information list generated according to the first candidate topic information list and the second candidate topic information list. Correspondingly, before the displaying a candidate topic information list, the method further includes generating the candidate topic information list according to the first candidate topic information list and the second candidate topic information list.

The candidate topic information list is a third candidate topic information list, and the third candidate topic information list is generated according to attribute information of the first user account. Correspondingly, before the displaying a candidate topic information list, the method further includes: collecting attribute information of the first user account, where the attribute information includes at least one of user attribute information of the first user account, group attribute information of a group to which the first user account belongs, and user attribute information of other user accounts in the group other than the first user account; generating a third candidate topic information list according to the attribute information; and generating the candidate topic information list according to the third candidate topic information list.

For example, the user attribute information of the first user account (or other user accounts) can be obtained by analyzing the user account information, and historical browsing records of the user. For example, the user account information includes when the user is a student, exams, studies, grades, and sports are used as candidate topic information in the third candidate topic information list.

For example, group attribute information of the group to which the first user account belongs may be obtained by analyzing a type of the group and historical chat records in the group. For example, if the group is an office group, performance, a service pacesetter, and awards are used as candidate topic information in the third candidate topic information list.

The first client can determine which one of the four candidate topic information lists is preferentially selected for display. The configuration is default configuration of the first client, or is configured according to user settings. For example, the first client preferentially displays the second candidate topic information list obtained from the server.

In the method provided in this embodiment, the user is provided with a candidate topic information list, so that the user can directly select a piece of topic information from the candidate topic information list to transmit the virtual item packet. Accordingly, an input operation performed by the user is simplified, and the transmission efficiency of the virtual item packet is improved.

In another embodiment, the obtaining topic information corresponding to a virtual item packet includes displaying an editing control; and determining the topic information according to an editing operation on the editing control.

That is, the user can voluntarily edit the topic information, and the first client obtains text information inputted by the user through the editing control according to the user's editing, so as to determine the topic information corresponding to the virtual item packet.

For example, referring to FIG. 6, on the editing interface of the virtual item packet, the user can perform editing at a position corresponding to the editing control 601 and input the desired topic information.

The editing control can also obtain the picture information, audio information, or video information uploaded by the user, and determine the picture information, audio information, or video information as the topic information.

In the method provided in this embodiment, the user is provided with an editing control, so that the user can voluntarily edit the topic information through the editing control. Accordingly, the operability of the user in a process of transmitting the virtual item packet is improved.

Step 520. Obtain parameter information corresponding to the virtual item packet, the virtual item packet carrying a virtual item.

The first client obtains parameter information corresponding to a virtual item packet. The parameter information may include at least one of the number of virtual item packets, the total number of virtual items, the number of virtual items in a single virtual item packet, and a manner of dividing the number of virtual items in a single virtual item packet.

For example, on the editing interface of the virtual item packet, in addition to the topic information, the user further needs to edit other parameter information of the virtual item packet. The number of virtual item packets refers to the number of times that the virtual item packet can be received by other users. The total number of virtual items refers to a sum of all virtual items in the virtual item packet. The number of virtual items in each virtual item packet can be the same or different, and is determined by at least one of two parameters: the number of virtual items in a single virtual item packet and the manner of dividing the number of virtual items in a single virtual item packet. For example, the number of virtual items in each virtual item packet is the same when the number of virtual items in a single virtual item packet is divided equally; and the number of virtual items in each virtual item packet is the same or different when the number of virtual items in a single virtual item packet is divided by luck (that is, random allocation).

In some cases, the parameter information may further include time for transmitting the virtual item packet, user account information for specifying that the virtual item packet is exclusive to some specific user accounts. The user can perform editing on other attributes of the virtual item packet, which is not limited in this embodiment of this application.

It can be understood that this embodiment of this application does not limit an implementation order of the step 510 and the step 520.

Step 530. Display a virtual item packet transmitted by a first user account, the virtual item packet being generated according to topic information and parameter information, and the virtual item packet including the topic information.

After the first client receives the parameter information and the topic information inputted by the user corresponding to the first user account, the server (or the first client) generates a virtual item packet according to the parameter information and the topic information. On the user interface of the first client, the virtual item packet transmitted by the first user account is displayed. For example, the user interface is a chat user interface of an instant messaging client, a video client, an information client, a financial client, and a game client; or the instant messaging client and the user interface are comment interfaces of the video client, the information client, and the instant messaging client.

In one embodiment, the first client transmits a virtual item packet transmission request to the server, and the virtual item packet transmission request is used for requesting the server to transmit the virtual item packet to the second client, where the virtual item packet transmission request includes: at least one of an identifier of the virtual item packet, topic information, style information of the virtual item packet, and an authentication key of the virtual item packet.

The identifier of the virtual item packet is used for identifying the virtual item packet; the topic information is used for describing a topic of the interaction message that the first user account expects to receive; the style information of the virtual item packet is used for determining a style of the virtual item packet; and the authentication key of the virtual item packet is configured to ensure the security of the virtual item packet.

That is, after receiving the parameter information and the topic information, the first client needs to request the server to transmit the virtual item packet corresponding to the first client. The server generates the virtual item packet according to the virtual item packet transmission request, and transmits the virtual item packet to the first client and at least one second client, and the first client displays the virtual item packet including the topic information on the user interface.

For example, the user account corresponding to a destination (that is, the second client) of transmitting is the second user account, and the second user account and the first user account are in a chat session. The chat session may be a group chat session or a one-to-one chat session. The server transmits the virtual item packet to the second client corresponding to another user account (that is, the second user account) in the chat session when the first user account transmits the virtual item packet in a one-to-one chat session; and the server transmits the virtual item packet to the second client corresponding to some or all of the user accounts in the chat session when the first user account transmits the virtual item packet in a group chat session.

The topic information on the virtual item packet is displayed in a specific display format. The display format may include information displayed close to the topic information, a font used for displaying the topic information, an arrangement style of displaying the topic information, or the like. Before displaying the virtual item packet, the first client performs detection on a description attribute of the topic information; and determines a display format of the topic information according to the description attribute, where the description attribute includes: one of positive description and negative description.

For example, the description attribute of the topic information can be determined according to the content of the topic information, for example, the description attribute can be divided into topic information of the positive description, such as: handsomeness and promotion; and topic information of the negative description such as: falling out of love and illness. For the topic information of the positive description, the topic information is displayed in a first display format, and the first display format includes: displaying praise me "xxx", such as praise me "handsome"; and for the topic information of the negative description, the topic information is displayed in a second display format, and the second display format includes: displaying "xxx" please praise me, such as "falling out of love" please praise me.

It can be understood that, to receive the virtual item packet, the second user account needs to reply to an interaction message to the first user account. The interaction message replied by the second user account is displayed on the user interface of the first client, where the interaction message is used for being matched with target information to request to receive a virtual item in the virtual item packet, and the target information is the topic information or information associated with the topic information.

In summary, in the method provided in this embodiment, the topic information is set for the virtual item packet, so that the user can obtain the expected interaction message that is matched with the topic by transmitting the virtual item packet. Accordingly, a manner the user transmits the virtual item packet is enriched, and the flow of the virtual item among users is promoted. In addition, through the interaction between the topic information and the interaction message, the message interaction between a transmitter and a receiver of the virtual item packet is implemented, and the interactivity of the virtual item packet is improved.

Figure 7:
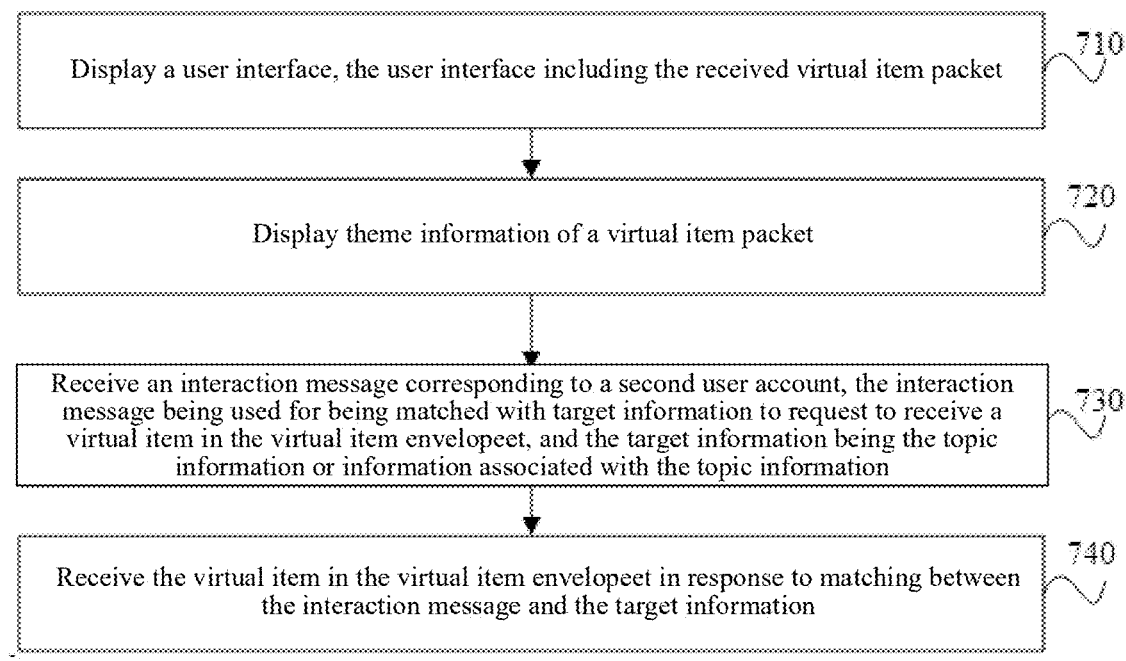
FIG. 7 is a flowchart of an information processing method according to an embodiment of this application.

FIG. 7 is a method flowchart of an information processing method according to an embodiment of this application. Using an execution entity of the method as the second client in the second terminal 30 shown in FIG. 1 as an example, the second terminal 30 runs a second client that supports receiving the virtual item packet, that is, the computer device is the second client in this case. The method at least includes the following steps:

Step 710. Display a user interface, the user interface including the received virtual item packet.

The second client displays the user interface. The user interface is an interface that displays information interaction between at least two user accounts. For example, the user interface is a chat user interface of an instant messaging client, a video client, an information client, a financial client, and a game client; or the user interface is a comment interface of the video client, the information client, and the instant messaging client.

For example, the user interface is a chat user interface of the instant messaging client, and an interaction message is a chat message. The second client includes a virtual item packet on the chat user interface, that is, the virtual item packet is displayed through the user interface, and the second client can receive the virtual item packet by receiving the chat message.

For example, the user interface is a comment interface of the information client. The user can comment on information (such as dynamic information and news information published by a user) on the comment interface, and the interaction message is a comment message. The second client displays a virtual item packet on the comment user interface, and the second client can receive the virtual item packet by receiving the comment message.

Because the first client corresponding to the first user account transmits the virtual item packet to the second client, the second client includes the virtual item packet on the user interface. That is, the virtual item packet is displayed through the user interface to prompt that the second user account receives the virtual item packet from the first user account.

In one embodiment, the topic information corresponding to the virtual item packet is displayed on the virtual item packet. For example, as shown in (1) in FIG. 3, the virtual item packet 209 transmitted by the first user account 208 is displayed on the chat user interface corresponding to the second user account. The topic information is displayed on the virtual item packet: praise me "gaining weight".

Step 720. Display topic information of a virtual item packet.

The virtual item packet includes the topic information, where the topic information is used for describing a topic of the interaction message that the first user account expects to receive. The second client displays the topic information of the virtual item packet, so that the user corresponding to the second user account can reply to an interaction message to the first user account according to the topic information, thereby receiving the virtual item in the virtual item packet. The interaction message is a message used for interaction between the first client and the second client. The interaction message may be, for example, a chat message, a comment message, or the like. The topic information may be at least one piece of text information, audio information, video information, and picture information. If the topic information is audio information or video information, the second client plays the audio information or the video information. In one embodiment, the topic information is displayed on a receiving pop-up window. Step 720 includes: displaying a receiving pop-up window in response to a receiving operation on the virtual item packet, where the receiving pop-up window includes topic information of the virtual item packet and a first input interface of the interaction message.

The user receives the virtual item packet, and a receiving operation includes at least one of clicking, double-clicking, dragging, sliding, pressing, scanning, copying, pasting, and searching. After the second client receives the receiving operation performed by the user on the virtual item packet, the topic information of the virtual item packet is displayed.

After receiving the receiving operation, the second client displays a receiving pop-up window of the virtual item packet, and displays the topic information of the virtual item packet through the receiving pop-up window. The receiving pop-up window is displayed on an upper layer of the user interface; or completely covers the user interface, or partially covers the user interface. The receiving pop-up window can further be configured to display the interaction message inputted by the second user account.

For example, as shown in (2) in FIG. 3, the receiving pop-up window is displayed on the upper layer of the user interface, and the topic information is displayed on the receiving pop-up window: please praise me "gaining weight".

Figure 8:
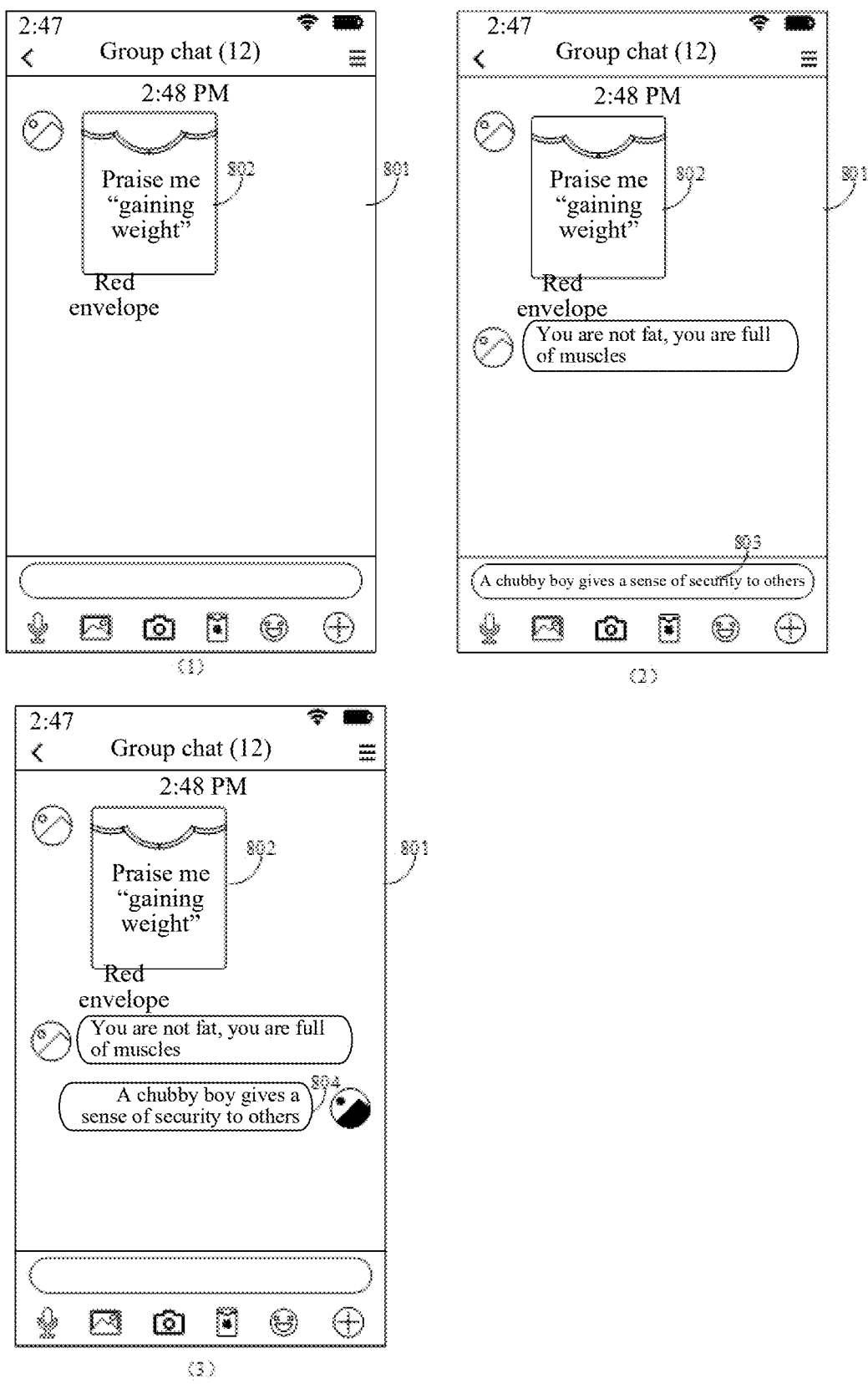
FIG. 8 is a schematic diagram of a user interface of an information processing method according to an embodiment of this application.

In another implementation, step 720 includes: displaying the topic information on the virtual item packet displayed on the user interface. For example, as shown in (1) in FIG. 8, the user interface is the chat user interface 801 of the instant messaging client. The virtual item packet 802 corresponding to the first user account is displayed on the chat user interface 801, and the topic information: praise me "gaining weight" is displayed on the virtual item packet 802.

Step 730. Receive an interaction message corresponding to a second user account, the interaction message being used for being matched with target information to request to receive a virtual item in the virtual item packet, and the target information being the topic information or information associated with the topic information.

The second client receives an interaction message corresponding to a second user account. The interaction message can be directly matched with the topic information, and can also be matched with information associated with the topic information, so as to determine whether the interaction message corresponds to a topic in the topic information. The information associated with the topic information is information used for representing semantics of the topic information. For example, the information associated with the topic information includes key information of the topic information, a preset corpus used for representing the topic information, synonymous information of the topic information, or the like.

In one embodiment, the receiving pop-up window includes a first input interface of the interaction message. Correspondingly, step 730 includes: receiving the interaction message through the first input interface.

In this case, a receiving pop-up window is displayed on the second client, and in addition to displaying the topic information, the receiving pop-up window further displays a first input interface of the interaction message. The user inputs an interaction message on the first input interface of the interaction message displayed on the receiving pop-up window, and the interaction message may be at least one of a text message, an audio message, a video message, and a picture message.

For example, as shown in (2) in FIG. 3, the receiving pop-up window is displayed on the upper layer of the chat user interface, and the receiving pop-up window includes a first input interface 210. The user inputs an interaction message through the first input interface 210: a chubby boy gives a sense of security to others.

In one embodiment, the topic information is displayed on the virtual item packet displayed on the user interface. Correspondingly, step 730 includes: receiving the interaction message through the second input interface on the user interface.

In this case, the user inputs the interaction message at the second input interface on the user interface, and the interaction message may be at least one of a text message, an audio message, a video message, and a picture message.

The second client receives the interaction message through a second input interface on the user interface, including:

First, receiving a candidate message corresponding to the second user account through the second input interface on the user interface; and using the candidate message as the interaction message when a time interval between a time at which the candidate message is displayed and a time at which the virtual item packet is displayed being less than a second threshold.

That is, the second client uses a message inputted by the user corresponding to the second user account as a candidate message, and determines that the candidate message is an interaction message for the virtual item packet when a time interval between a time at which the candidate message is displayed and a time at which the virtual item packet is displayed is less than a second threshold.

For example, the second threshold is 2 minutes. As shown in (2) in FIG. 8, the user interface is the chat user interface 801 of the instant messaging client, and the user corresponding to the second user account inputs a candidate message in text form at the second input interface 803: a chubby boy gives a sense of security to others. As shown in (3) in FIG. 8, a candidate message 804 inputted by the user corresponding to the second user account is displayed on the chat user interface. The second client obtains a time at which the candidate message 804 is displayed is 2:48:50 PM, and a time at which the virtual item packet 802 is displayed is 2:48:13 PM. If a time interval between the two is less than the second threshold of 2 minutes, it is determined that the candidate message is an interaction message.

Second, a candidate message corresponding to the second user account is received through the second input interface on the user interface; and the candidate message is used as the interaction message when a number of messages spaced between the candidate message and the virtual item packet are less than a third threshold.

That is, the second client uses a message inputted by the user corresponding to the second user account as a candidate message, and determines that the candidate message is an interaction message for the virtual item packet when the number of messages spaced between the candidate message and the virtual item packet is less than the third threshold.

For example, the third threshold has 20 messages. As shown in (2) in FIG. 8, the user interface is the chat user interface 801 of the instant messaging client, and the user corresponding to the second user account inputs a candidate message in text form at the second input interface 803: a chubby boy gives a sense of security to others. As shown in (3) in FIG. 8, a candidate message 804 inputted by the user corresponding to the second user account is displayed on the chat user interface. If the number of messages spaced between the candidate message 804 and the virtual item packet 802 is 1, and the number of messages is less than the 20 messages that the third threshold has, it is determined that the candidate message is an interaction message. Accordingly, the possibility of misrecognizing other candidate messages transmitted by the second user account to the first user account as the interaction message is minimized after the virtual item packet is received or expired.

Third, a candidate message corresponding to the second user account is received through the second input interface on the user interface; and the candidate message is used as the interaction message when the candidate message includes a response identifier, and the response identifier being used for identifying that the candidate message is the interaction message.

The response identifier includes, but is not limited to at least one of keywords corresponding to the topic information, an identifier @ a preset response word, and a nickname of the first user account. The preset response words may be a pronoun such as "you", or adjectives such as "very good" and "excellent".

For example, the response identifier is the identifier @. As shown in (2) in FIG. 8, the user interface is the chat user interface 801 of the instant messaging client, and the user corresponding to the second user account inputs a candidate message in text form at the second input interface 803: a chubby boy gives a sense of security to others. As shown in (3) in FIG. 8, a candidate message 804 inputted by the user corresponding to the second user account is displayed on the chat user interface. If the candidate message 804 does not include the identifier @ the candidate message 804 is not an interaction message.

For example, the response identifier is the keywords corresponding to the topic information. As shown in (2) in FIG. 8, the user interface is the chat user interface 801 of the instant messaging client, and the user corresponding to the second user account inputs a candidate message in text form at the second input interface 803: a chubby boy gives a sense of security to others. As shown in (3) in FIG. 8, a candidate message 804 inputted by the user corresponding to the second user account is displayed on the chat user interface. If the keyword corresponding to the topic information is "fat", and the candidate message 804 includes "fat", the candidate message 804 is an interaction message.

Step 740. Receive the virtual item in the virtual item packet in response to matching between the interaction message and the target information.

If it is determined that the interaction message is matched with the target information, the second client receives the virtual item in the virtual item packet.

The interaction message is at least one of a text message, an audio message, a video message, and a picture message. The topic information may be at least one piece of text information, audio information, video information, and picture information. The interaction message is matched with the target information, which means that the message content of any form of interaction message conforms to the topic described in any form of topic message.

When the interaction message is matched with the target information, the second client transmits a receiving request to the server, the receiving request carries a matching success indication, and the server transmits the virtual item in the virtual item packet to the second client according to the matching success indication. The second client correspondingly receives the virtual item in the virtual item packet.

After the second client successfully receives the virtual item in the virtual item packet, the interaction message corresponding to the second user account is displayed on the user interface. For example, as shown in (4) in FIG. 3, an interaction message 213 corresponding to the second user account is displayed on the chat user interface: a chubby boy gives a sense of security to others.

In one embodiment, the second client performs detection on whether the interaction message is matched with the target information.

When both the interaction message and the topic information are text, or both can be converted into text, recognition can be performed by either of the following two recognition manners to determine whether the interaction message is matched with the target information, and then determine whether the virtual item in the virtual item packet can be received.

Recognition manner 1: The second client determines a topic space model corresponding to the topic information; determines a degree of matching between the interaction message and the target information according to a cosine value between the interaction message and the topic space model; and receives the virtual item in the virtual item packet when the degree of matching is greater than a first threshold.

The topic space model is a space model that describes semantics of the topic information.

The topic space model includes at least two pieces of entry point information corresponding to the topic information, the at least two pieces of entry point information are used for describing different aspects of the topic information, the entry point information corresponds to n preset corpora, and n is a positive integer.

Figure 9:
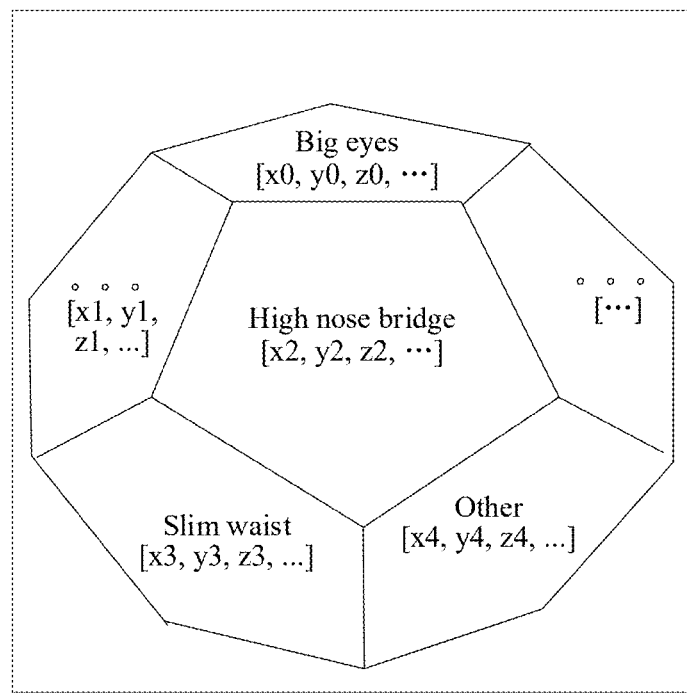
FIG. 9 is a schematic diagram of a topic space model according to an embodiment of this application.

To clarify the interaction message related to the topic information, a topic space model needs to be constructed. The topic space model is a multi-dimensional space model corresponding to the topic information. Any object is a polyhedron and has many faces. Similarly, a piece of topic information can also be expressed in a plurality of manners, and correspond to a plurality of language organization forms. For example, as shown in FIG. 9, for the topic information "praise me pretty", entry point information can be big eyes, a high nose bridge, a slim waist, or the like. Each piece of entry point information can correspond to an n-dimensional coordinate in the topic space model, such as: big eyes correspond to [x0, y0, z0, . . . ]. In addition, each piece of entry point information corresponds to several preset corpora.

Correspondingly, the determining a degree of matching between the interaction message and the topic information according to a cosine value between the interaction message and the topic space model can include: mapping the interaction message to a vector space to obtain an interaction message vector; determining an $i^{th}$ cosine value between the interaction message vector and a preset corpus vector corresponding to an $i^{th}$ preset corpus, where i is a positive integer; determining the largest cosine value as the cosine value between the interaction message and the topic space model; and determining the degree of matching according to the cosine value.

That is, the preset corpus corresponding to the topic space model is a type of information associated with the topic information. Sentences can be quantified by the sentence vector technology to represent semantics of the sentences. The greater the cosine value of the sentence vectors corresponding to two sentences, the closer the semantics of the two sentences. For example, for different sentences, to calculate the similarity between the sentences, the sentences are first mapped to the vector space to form a mapping relationship between the sentences and the sentence vectors, and the similarity between the sentences is calculated by calculating the difference between the two sentence vectors. The difference between the two sentence vectors can be measured by the cosine similarity. The cosine similarity refers to a cosine value of an angle between the two sentence vectors in the vector space. The closer the cosine value is to 1, the closer the angle is to 0 degree, and the more similar the two sentence vectors are. Therefore, the interaction message vector of the interaction message and the cosine value of the preset corpus vector corresponding to the preset corpus related to the topic can be calculated to determine whether an interaction message is matched with the target information. The greater the cosine value, the higher the degree of matching.

Assuming that the preset corpus corresponding to the entry point information "big eyes" is Big Eye ("long eyelashes, big eyes, slightly raised double eyelids, and piercing eyes"), and a threshold is 0.7, it can be considered that the interaction message "X" is matched with the topic information "praise me pretty" when CosDistance (Big Eye, "X") >=0.7.

For example, the interaction message "X" is "Her eyes, big and black, sparkling, and very attractive", and CosDistance ("Long eyelashes, big eyes, slightly raised double eyelids, and piercing eyes", and "Her eyes, big and black, sparkling, and very attractive")=0.7854568564897607, which is greater than the threshold of 0.7. It can be seen that the virtual item packet with the topic information of "praise me pretty" can be opened with "Her eyes, big and black, sparkling, and very attractive".

For example, the interaction message "X" is "It's so nice of him that he remembers clearly what I said casually", and CosDistance ("Long eyelashes, big eyes, slightly raised double eyelids, and piercing eyes", and "It's so nice of him that he remembers clearly what I said casually") = 0.6270294821483049, which is less than the threshold of 0.7. It can be seen that the virtual item packet with the topic information of "praise me pretty" cannot be opened with "It's so nice of him that he remembers clearly what I said casually".

In the method provided in this embodiment, the second client can determine a degree of matching between the interaction message and the target information through a cosine value between the interaction message and the topic space model; or determine whether the interaction message is matched with the target information through the keywords corresponding to the interaction message, so as to accurately determine whether the virtual item in the virtual item packet can be received according to whether the interaction message is matched with the target information.

The number of the virtual items in the virtual item packet is positively correlated to the degree of matching. For example, the total number of virtual items in the virtual item packet is 10. If the cosine value between the interaction message and the topic space model is 0.8, it is determined that the degree of matching between the interaction message and the target information is 6, and the number of virtual items in the virtual item packet received by the second client is 6; and if the cosine value between the interaction message and the topic space model is 0.9, it is determined that the degree of matching between the interaction message and the target information is 8, and the number of virtual items in the virtual item packet received by the second client is 8. Comparing to a keyword recognition method that may produce inconsistent and/or inaccurate outcome, the disclosed natural language processing recognition method based on space model can provide a determination on the matching degrees with higher accuracy and consistency. In some embodiments, the disclosed NLP recognition method is suitable in determining matching degrees between complementing messages and topics.

Recognition manner 2: The second client extracts keywords in the interaction message; obtains a preset topic list corresponding to the keywords; determines that the interaction message is matched with the topic information when a topic in the topic information is in the preset topic list; and receives the virtual item in the virtual item packet.

The keywords in the interaction message are words or phrases that summarize the message content of the interaction message to the greatest extent. Because the keywords are generalized and centralized description of the interaction message, the keywords can be used to perform recognition on whether the interaction message is matched with the target information.

A preset topic list is a collection of topics related to the keywords. Each keyword corresponds to a preset topic list, and the preset topic list includes one or more topics. The second client can determine that the interaction message is matched with the target information when the topic in the topic information is in the preset topic list.

For example, the interaction message includes: Your review help you achieve a good result. A keyword extracted by the second client is: review. The preset topic list corresponding to review includes exam, grade, certificate, study, or the like. The topic information is praise me "grade", and if "grade" is in the preset topic list, the second client can determine that the interaction message is matched with the target information, and the second client receives the virtual item in the virtual item packet.

For example, the interaction message includes: The weather is so nice. A keyword extracted by the second client is: weather. The preset topic list corresponding to weather includes exercise, good mood, or the like. The topic information is praise me "hairstyle", and if "hairstyle" is not in the preset topic list, the second client can determine that the interaction message is not matched with the target information, and the second client cannot receive the virtual item in the virtual item packet. Compared to manual determination, this recognition manner provides consistent determination result without subjectivity.

In another implementation, the server performs detection on whether the interaction message is matched with the target information. That is, the virtual item in the virtual item packet received by the second client is transmitted by a server in a case of monitoring that the interaction message is matched with the target information.

In this case, a manner for the server to perform detection and recognition is any one of the recognition manner 1 and the recognition manner 2.

In some cases, before step 740, the second client may perform recognition on an emotional attribute of the interaction message; and perform detection on whether the interaction message is matched with the target information when the emotional attribute belongs to a positive emotion.

That is, the second client first determines the emotional attribute of the interaction message. If the emotional attribute belongs to a negative emotion, detection does not need to be performed on whether the interaction message is matched with the target information, and the second client cannot receive the virtual item in the virtual item packet. If the emotional attribute belongs to the positive emotion, detection is performed on whether the interaction message is matched with the topic information. The second client receives the virtual item in the virtual item packet when the interaction message is matched with the target information.

In the method provided in this embodiment, the second client can first determine the emotional attribute of the interaction message, and then perform detection on whether the interaction message is matched with the target information, thereby avoiding an invalid detection process and improving the efficiency of utilizing the computing resource.

For example, the topic information is praise me "gaining weight", and the interaction message is "You gain weight, and you are so ugly". The second client determines that the emotional attribute of the interaction message belongs to the negative emotion, and does not perform detection on whether the interaction message is matched with the target information.

For example, the topic information is praise me "gaining weight", and the interaction message is "You are not fat, you are full of muscles". The second client determines that the emotional attribute of the interaction message belongs to the positive emotion, and performs detection on whether the interaction message is matched with the target information.

In summary, in the method provided in this embodiment, the topic information is set for the virtual item packet, so that the user can obtain the virtual item in the virtual item packet by inputting the interaction message that is matched with the target information, and the target information is the topic information, or the information associated with the topic information. Accordingly, a manner the user receives the virtual item packet is enriched, and the flow of virtual items among users is promoted. In addition, through the interaction between the topic information and the interaction message, the message interaction between a transmitter and a receiver of the virtual item packet is implemented, and the interactivity of the virtual item packet is improved.

Figure 10:
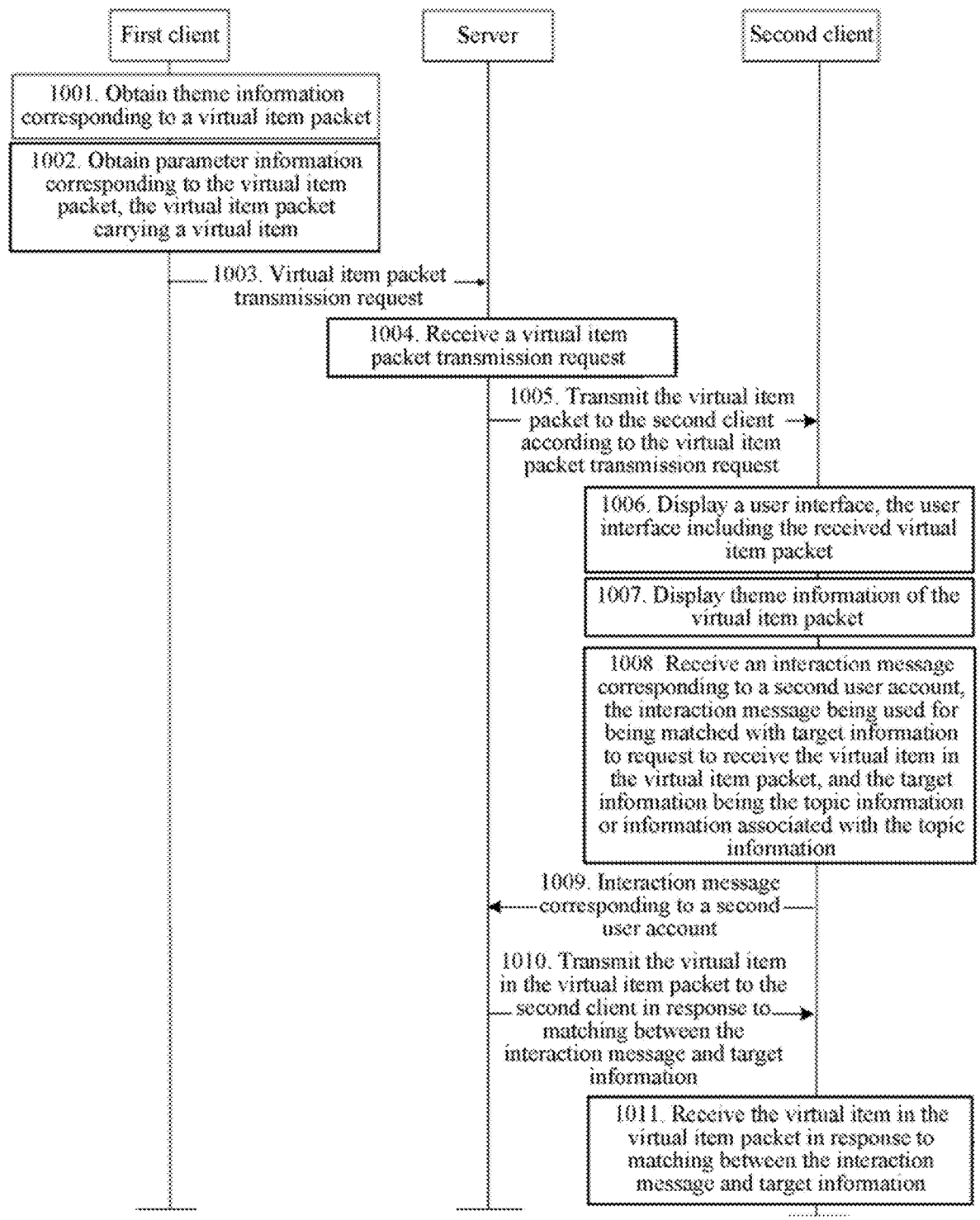
FIG. 10 is a flowchart of an information processing method according to an embodiment of this application.

FIG. 10 is a method flowchart of an information processing method according to an embodiment of this application. Description is made by an example in which an execution entity of the method is the first client in the first terminal 10, the server 20, and the second client in the second terminal 30 shown in FIG. 1. The first terminal 10 runs a first client that supports transmitting the virtual item packet, and the second terminal 30 runs a second client that supports receiving the virtual item packet. The method at least includes the following steps:

Step 1001. The first client obtains topic information corresponding to a virtual item packet.

The topic information is used for describing a topic of the interaction message that the first user account expects to receive. The interaction message is a message used for interaction between the first client and the second client. The interaction message may be, for example, a chat message, a comment message, or the like.

For an implementation of step 1001, reference may be made to the step 510, and details are not repeated herein.

The server may transmit a second candidate topic information list to the first client, where the second candidate topic information list is used for the first user account to select topic information.

Step 1002. The first client obtains parameter information corresponding to the virtual item packet, the virtual item packet carrying a virtual item.

For an implementation of step 1002, reference may be made to the step 520, and details are not repeated herein.

Step 1003. The first client transmits a virtual item packet transmission request to the server, a first user account being logged in to the first client.

The virtual item packet transmission request is used for requesting the server to transmit the virtual item packet to the second client. The second client may be one or more, which is not limited in this embodiment.

Step 1004: The server receives the virtual item packet transmission request from the first client.

Step 1005. The server transmits a virtual item packet to a second client according to the virtual item packet transmission request, the virtual item packet including topic information.

The topic information is used for describing a topic of the interaction message that the first user account expects to receive.

The virtual item packet transmission request carries the topic information and the parameter information corresponding to the virtual item packet, and the server generates the virtual item packet according to the topic information and the parameter information. After generating the virtual item packet, the server transmits the virtual item packet to the second client according to the virtual item packet transmission request.

Step 1006. The second client displays a user interface, the user interface including the received virtual item packet.

Because the server transmits the virtual item packet to the second client, after receiving the virtual item packet, the second client correspondingly displays the virtual item packet corresponding to the first user account on the user interface.

For an implementation of step 1006, reference may be made to the step 710, and details are not repeated herein.

Step 1007. The second client displays the topic information of the virtual item packet in response to a receiving operation on the virtual item packet.

For an implementation of step 1007, reference may be made to the step 720, and details are not repeated herein.

Step 1008. The second client receives an interaction message corresponding to a second user account, the interaction message being used for being matched with target information to request to receive a virtual item in the virtual item packet, and the target information being the topic information or information associated with the topic information.

For an implementation of step 1008, reference may be made to the step 730, and details are not repeated herein.

Step 1009. The server obtains an interaction message corresponding to a second user account, the second user account being an account logged in to the second client.

After receiving the interaction message, the second client may transmit the interaction message to the server.

The interaction message is analyzed and recognized by the server to determine whether the interaction message is matched with the target information. For example, step 1009 includes: receiving a recognition request from the second client, where the recognition request carries the interaction message, and the recognition request is used for requesting the server to perform recognition on whether the interaction message is matched with the target information.

Step 1010. The server transmits a virtual item in the virtual item packet to the second client in response to matching between an interaction message and target information, the target information being the topic information or information associated with the topic information.

The interaction message is at least one of a text message, an audio message, a video message, and a picture message. The topic information may be at least one piece of text information, audio information, video information, and picture information. The interaction message is matched with the target information, which means that the message content of any form of interaction message conforms to the topic described in any form of topic message.

In one embodiment, the second client performs recognition on whether the interaction message is matched with the target information. The second client transmits the recognized result to the server, and the server transmits the virtual item in the virtual item packet to the second client according to the recognition result when the interaction message is matched with the target information.

In another implementation, the server performs recognition on whether the interaction message is matched with the target information. The virtual item in the virtual item packet is transmitted to the second client when the interaction message is matched with the target information.

The server transmits matching failure information to the second client, instructing the user to re-input the interaction message when the interaction message is not matched with the target information.

When both the interaction message and the topic information are text, or both can be converted into text, the server performs recognition by either of the recognition manner 1 and the recognition manner 2 to determine whether the interaction message is matched with the target information.

Recognition manner 1: The server determines a topic space model corresponding to the topic information; determines a degree of matching between the interaction message and the target information according to a cosine value between the interaction message and the topic space model; and transmits the virtual item in the virtual item packet to the second client when the degree of matching is greater than a first threshold.

Recognition manner 2: The server extracts keywords in the interaction message; obtains a preset topic list corresponding to the keywords; determines that the interaction message is matched with the target information when a topic in the topic information is in the preset topic list; and transmits the virtual item in the virtual item packet to the second client.

For the recognition manner 1 and the recognition manner 2, reference may be made to the foregoing embodiments, and details are not repeated herein.

In the method provided in this embodiment, the server can determine a degree of matching between the interaction message and the target information through a cosine value between the interaction message and the topic space model; or determine whether the interaction message is matched with the target information through a keyword corresponding to the interaction message, so as to accurately determine whether the virtual item in the virtual item packet needs to be transmitted to the second client according to whether the interaction message is matched with the target information.

In the foregoing two implementations, the server transmits the virtual item in the virtual item packet to the second client, including: receiving a receiving request from the second client, where the receiving request carries a matching success indication, and the matching success indication is transmitted by the second client when the interaction message is matched with the target information; and transmitting the virtual item in the virtual item packet to the second client according to the matching success indication.

That is, when the interaction message is matched with the target information, the server needs to receive a receiving request from the second client, and transmit the virtual item in the virtual item packet to the second client in response to the receiving request.

Before step 1010, the server performs recognition on an emotional attribute of the interaction message; and perform detection on whether the interaction message is matched with the target information when the emotional attribute belongs to a positive emotion.

That is, the server first determines the emotional attribute of the interaction message. If the emotional attribute belongs to a negative emotion, detection does not need to be performed on whether the interaction message is matched with the target information.

In the method provided in this embodiment, the server can first determine the emotional attribute of the interaction message, and then perform detection on whether the interaction message is matched with the target information, thereby avoiding an invalid detection process and improving the efficiency of utilizing the computing resource.

Step 1011. The second client receives the virtual item in the virtual item packet in response to matching between the interaction message and the target information.

For an implementation of step 1011, reference may be made to the step 740, and details are not repeated herein.

After step 1011, the server transmits an interaction message to the first client. Correspondingly, the first client displays an interaction message corresponding to a second user account.

In summary, in the method provided in this embodiment, the topic information is set for the virtual item packet, so that the user can obtain the virtual item in the virtual item packet by inputting the interaction message that is matched with the target information, and the target information is the topic information, or the information associated with the topic information. Accordingly, a manner the user receives the virtual item packet is enriched, and the flow of virtual items among users is promoted. In addition, through the interaction between the topic information and the interaction message, the message interaction between a transmitter and a receiver of the virtual item packet is implemented, and the interactivity of the virtual item packet is improved.

Apparatus embodiments of this application are described below. Reference may be made to the foregoing method embodiments for details that are not described in the apparatus embodiments.

Figure 11:
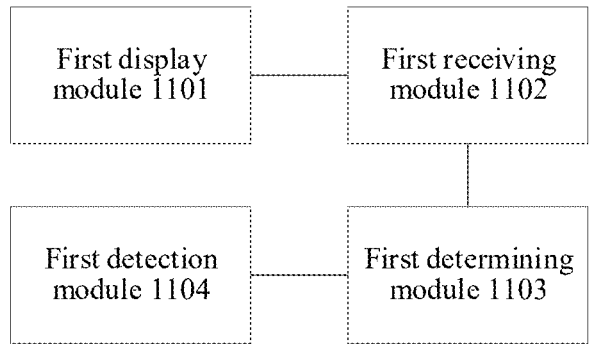
FIG. 11 is a block diagram of an information processing apparatus according to an embodiment of this application.

FIG. 11 is a block diagram of an information processing apparatus according to an embodiment of this application. The apparatus includes: a first display module 1101 and a first receiving module 1102;

the first display module 1101 is configured to display a user interface, the user interface including a received virtual item packet, and the virtual item packet including topic information;

the first display module 1101 is configured to display topic information of the virtual item packet, and the topic information is used for describing a topic of the interaction message that the first user account expects to receive;

the first receiving module 1102 is configured to receive an interaction message corresponding to a second user account, the interaction message being used for being matched with target information to request to receive a virtual item in the virtual item packet, and the target information being the topic information or information associated with the topic information; and the first receiving module 1102 is configured to receive the virtual item in the virtual item packet in response to matching between the interaction message and the target information.

In one embodiment, the apparatus further includes a first determining module 1103; the first determining module 1103 is configured to determine a topic space model corresponding to the topic information; the first determining module 1103 is configured to determine a degree of matching between the interaction message and the target information according to a cosine value between the interaction message and the topic space model; and the first receiving module 1102 is configured to receive the virtual item in the virtual item packet when the degree of matching is greater than a first threshold.

In one embodiment, the topic space model includes at least two pieces of entry point information corresponding to the topic information, the at least two pieces of entry point information are used for describing different aspects of the topic information, the entry point information corresponds to n preset corpora, and n is a positive integer; the first determining module 1103 is configured to map the interaction message to a vector space to obtain an interaction message vector; the first determining module 1103 is configured to determine an $i^{th}$ cosine value between the interaction message vector and a preset corpus vector corresponding to an $i^{th}$ preset corpus, where i is a positive integer; the first determining module 1103 is configured to determine the largest $i^{th}$ cosine value as the cosine value between the interaction message and the topic space model; and the first determining module 1103 is configured to determine the degree of matching according to the cosine value.

In one embodiment, a number of the virtual items in the virtual item packet is positively correlated to the degree of matching.

In one embodiment, the apparatus further includes a first determining module 1103; the first determining module 1103 is configured to extract keywords in the interaction message; the first determining module 1103 is configured to obtain a preset topic list corresponding to the keywords; the first determining module 1103 is configured to determine that the interaction message is matched with the target information when a topic in the topic information is in the preset topic list; and the first receiving module 1102 is configured to receive the virtual item in the virtual item packet.

In one embodiment, the apparatus further includes: a first detection module 1104; and the first detection module 1104 is configured to perform recognition on an emotional attribute of the interaction message; and the first detection module 1104 is configured to perform detection on whether the interaction message is matched with the target information when the emotional attribute belongs to a positive emotion.

In one embodiment, the first display module 1101 is configured to display a receiving pop-up window in response to a receiving operation on the virtual item packet, where the receiving pop-up window includes topic information of the virtual item packet and a first input interface of the interaction message; and the first receiving module 1102 is configured to receive the interaction message through the first input interface.

In one embodiment, the first display module 1101 is configured to display the topic information on the virtual item packet displayed on the user interface; and the first receiving module 1102 is configured to receive the interaction message through a second input interface on the user interface.

In one embodiment, the first receiving module 1102 is configured to receive a candidate message corresponding to the second user account through the second input interface on the user interface; the first determining module 1103 is configured to use the candidate message as the interaction message when a time interval between a time at which the candidate message is displayed and a time at which the virtual item packet is displayed is less than a second threshold; or the first determining module 1103 is configured to use the candidate message as the interaction message when a number of messages spaced between the candidate message and the virtual item packet are less than a third threshold; and or the first determining module 1103 is configured to use the candidate message as the interaction message when the candidate message includes a response identifier, and the response identifier being used for identifying that the candidate message is the interaction message.

In one embodiment, the received virtual item in the virtual item packet is transmitted by a server in a case of monitoring that the interaction message is matched with the target information.

Figure 12:
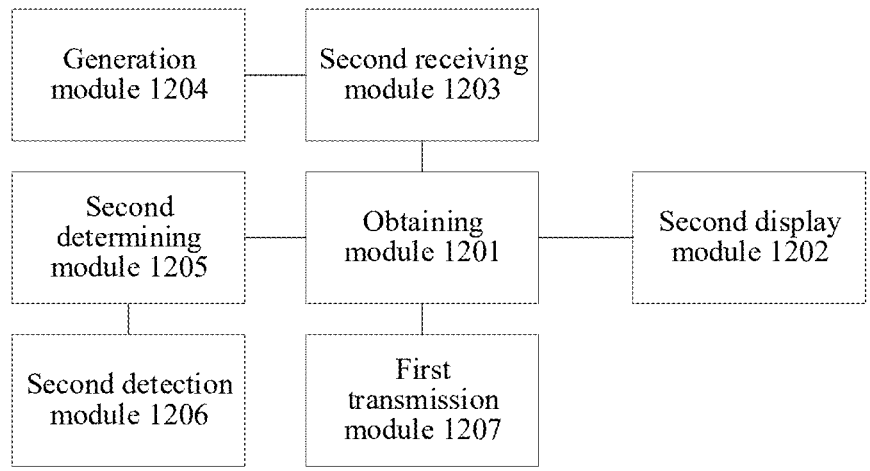
FIG. 12 is a block diagram of an information processing apparatus according to an embodiment of this application.

FIG. 12 is a block diagram of an information processing apparatus according to another embodiment of this application. the apparatus includes: an obtaining module 1201 and a second display module 1202;

the first obtaining module 1201 is configured to obtain topic information corresponding to the virtual item packet, and the topic information is used for describing a topic of the interaction message that the first user account expects to receive;

the obtaining module 1201 is configured to obtain parameter information corresponding to the virtual item packet, the virtual item packet carrying a virtual item; and the second display module 1202 is configured to display a virtual item packet transmitted by a first user account, the virtual item packet being generated according to topic information and parameter information, and the virtual item packet including the topic information.

In one embodiment, the apparatus further includes: a second receiving module 1203; the second display module 1202 is configured to display a candidate topic information list, where the candidate topic information list includes candidate topic information; and the second receiving module 1203 is configured to receive a selection operation on target topic information in the candidate topic information list, and use the target topic information as topic information corresponding to the virtual item packet.

In one embodiment, the apparatus further includes: a generation module 1204; the generation module 1204 is configured to generate the candidate topic information list according to the locally stored first candidate topic information list; or the generation module 1204 is configured to generate the candidate topic information list according to the second candidate topic information list transmitted by the server; or the generation module 1204 is configured to generate the candidate topic information list according to the first candidate topic information list and the second candidate topic information list; or the generation module 1204 is configured to collect the attribute information of the first user account, where the attribute information includes at least one of user attribute information of the first user account, group attribute information of a group to which the first user account belongs, and user attribute information of other user accounts in the group other than the first user account; generate a third candidate topic information list according to the attribute information; and generate the candidate topic information list according to the third candidate topic information list.

In one embodiment, the apparatus further includes: a second determining module 1205; the second display module 1202 is configured to display an editing control; and the second determining module 1205 is configured to determine the topic information according to an editing operation on the editing control.

In one embodiment, the apparatus further includes: a second detection module 1206 and a second determining module 1205; the second detection module 1206 is configured to perform detection on the description attribute of the topic information; and the second determining module 1205 is configured to determine a display format of the topic information according to the description attribute, where the description attribute includes: one of positive description and negative description.

In one embodiment, the parameter information includes: at least one of the number of virtual item packets, the total number of virtual items, the number of virtual items in a single virtual item packet, and a manner of dividing the number of virtual items in a single virtual item packet.

In one embodiment, the apparatus further includes: a first transmission module 1207, where the first transmission module 1207 is configured to transmit a virtual item packet transmission request to the server, and the virtual item packet transmission request is used for requesting the server to transmit the virtual item packet to at least one second client, where the virtual item packet transmission request includes: at least one of an identifier of the virtual item packet, topic information, style information of the virtual item packet, and an authentication key of the virtual item packet.

In one embodiment, the second display module 1202 is configured to display an interaction message corresponding to a second user account, where the interaction message is used for being matched with target information to request to receive the virtual item in the virtual item packet, and the target information is the topic information or information associated with the topic information.

Figure 13:
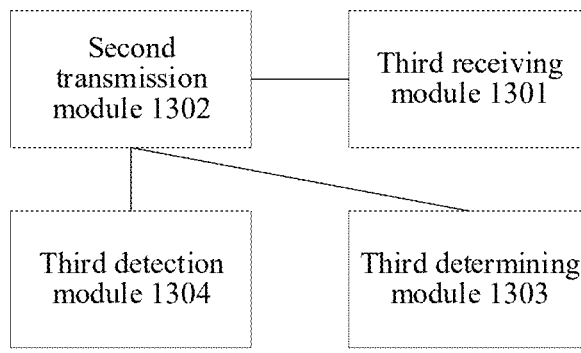
FIG. 13 is a block diagram of an information processing apparatus according to an embodiment of this application.

FIG. 13 is a block diagram of an information processing apparatus according to another embodiment of this application. The apparatus includes: a third receiving module 1301 and a second transmission module 1302;

the third receiving module 1301 is configured to receive a virtual item packet transmission request from a first client, a first user account being logged in to the first client;

the second transmission module 1302 is configured to transmit a virtual item packet to a second client according to the virtual item packet transmission request, the virtual item packet including topic information, and the topic information is used for describing a topic of the interaction message that the first user account expects to receive;

the third receiving module 1301 is configured to obtain an interaction message corresponding to a second user account, the second user account being an account logged in to the second client; and the second transmission module 1302 is configured to transmit a virtual item in the virtual item packet to the second client in response to matching between an interaction message and target information, the target information being the topic information or information associated with the topic information.

In one embodiment, the third receiving module 1301 is configured to receive a recognition request from the second client, where the recognition request carries the interaction message, and the recognition request is used for requesting the server to perform recognition on whether the interaction message is matched with the target information.

In one embodiment, the apparatus further includes a third determining module 1303; the third determining module 1303 is configured to determine a topic space model corresponding to the topic information; the third determining module 1303 is configured to determine a degree of matching between the interaction message and the target information according to a cosine value between the interaction message and the topic space model; and the second transmission module 1302 is configured to transmit the virtual item in the virtual item packet to the second client when the degree of matching is greater than a threshold.

In one embodiment, the topic space model includes at least two pieces of entry point information corresponding to the topic information, the at least two pieces of entry point information are used for describing different aspects of the topic information, the entry point information corresponds to n preset corpora, and n is a positive integer; the third determining module 1303 is configured to map the interaction message to a vector space to obtain an interaction message vector; the third determining module 1303 is configured to determine an $i^{th}$ cosine value between the interaction message vector and a preset corpus vector corresponding to an $i^{th}$ preset corpus, where i is a positive integer; the third determining module 1303 is configured to determine the largest $i^{th}$ cosine value as the cosine value between the interaction message and the topic space model; and the third determining module 1303 is configured to determine the degree of matching according to the cosine value.

In one embodiment, a number of the virtual items in the virtual item packet is positively correlated to the degree of matching.

In one embodiment, the apparatus further includes a third determining module 1303; the third determining module 1303 is configured to extract keywords in the interaction message; the third determining module 1303 is configured to obtain a preset topic list corresponding to the keywords; the third determining module 1303 is configured to determine that the interaction message is matched with the target information when a topic in the topic information is in the preset topic list; and the second transmission module 1302 is configured to transmit the virtual item in the virtual item packet to the second client.

In one embodiment, the apparatus further includes: a third detection module 1304; the third detection module 1304 is configured to perform recognition on an emotional attribute of the interaction message; and the third detection module 1304 is configured to perform detection on whether the interaction message is matched with the target information when the emotional attribute belongs to a positive emotion.

In one embodiment, the third receiving module 1301 is configured to receive a receiving request from the second client, where the receiving request carries a matching success indication, and the matching success indication is transmitted by the second client when the interaction message is matched with the target information; and the second transmission module 1302 is configured to transmit the virtual item in the virtual item packet to the second client according to the matching success indication.

In one embodiment, the second transmission module 1302 is configured to transmit a second candidate topic information list to the first client, where the second candidate topic information list is used for the first user account to select topic information.

In one embodiment, the second transmission module 1302 is configured to transmit the interaction message to the first client.

The information processing apparatus provided in the foregoing embodiments is illustrated with an example of division of the foregoing functional modules. In one embodiment, the foregoing functions may be assigned to and completed by different function modules as required. That is, an internal structure of the device may be divided into different function modules to complete all or some of the functions described above. In addition, the apparatus and method embodiments provided in the foregoing embodiments belong to one conception. For the specific implementation process, refer to the method embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
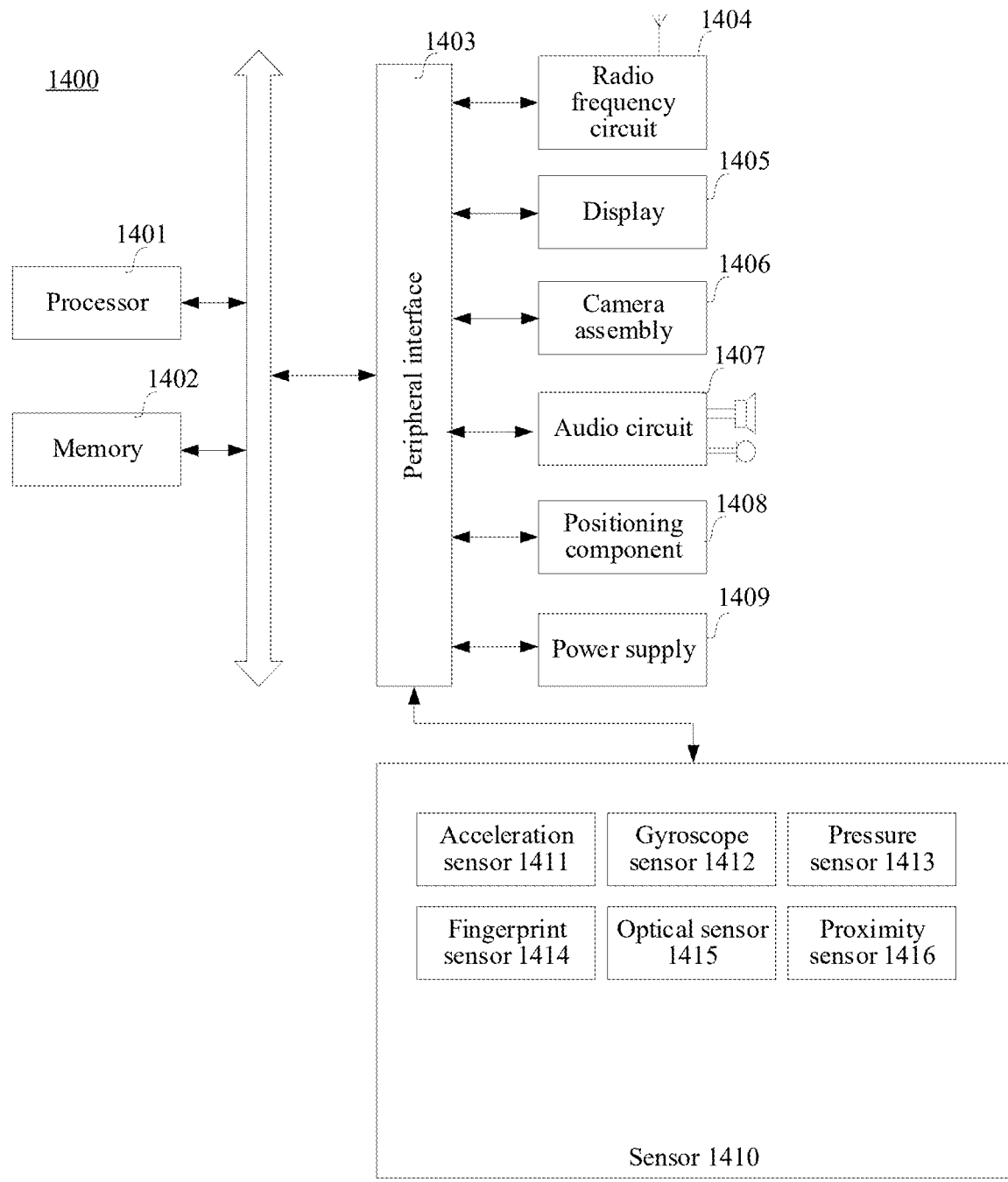
FIG. 14 is a block diagram of a terminal according to an embodiment of this application.

FIG. 14 is a structural block diagram of a terminal 1400 according to an embodiment of this application. The terminal 1400 may be a smartphone, a tablet computer, a moving picture experts group audio layer III (MP3) player, a moving picture experts group audio layer IV (MP4) player, a notebook computer, or a desktop computer. The terminal 1400 may also be referred to as user equipment, a portable terminal, a laptop terminal, a desktop terminal, or by another name.

Generally, the terminal 1400 includes a processor 1401 and a memory 1402.

The processor 1401 may include one or more processing cores, for example, a 4-core processor or an 8-core processor. The processor 1401 may be implemented by using at least one hardware form of a digital signal processor (DSP), a field-programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process the data in a standby state. In some embodiments, a graphics processing unit (GPU) may be integrated into the processor 1401. The GPU is configured to be responsible for rendering and drawing content to be displayed on a display screen. In some embodiments, the processor 1401 may further include an artificial intelligence (AI) processor. The AI processor is configured to process computing operations related to machine learning.

The memory 1402 may include one or more computer-readable storage media that may be non-transitory. The memory 1402 may further include a high-speed random access memory and a non-volatile memory, such as one or more magnetic disk storage devices or flash storage devices. In some embodiments, the non-transitory computer-readable storage medium in the memory 1402 is configured to store at least one instruction, and the at least one instruction is configured to be executed by the processor 1401 to implement the information processing method provided in the method embodiments of this application.

In some embodiments, the terminal 1400 may include a peripheral interface 1403 and at least one peripheral. the peripheral device includes at least one of a radio frequency (RF) circuit 1404, a touch display screen 1405, a camera component 1406, an audio circuit 1407, a positioning component 1408, and a power supply 1409.

In some embodiments, the terminal 1400 may also include one or more sensors 1410. The one or more sensors 1410 include, but are not limited to: an acceleration sensor 1411, a gyro sensor 1412, a pressure sensor 1413, a fingerprint sensor 1414, an optical sensor 1415, and a proximity sensor 1416.

A person skilled in the art may understand that the structure shown in FIG. 14 does not constitute a limitation to the terminal 1400, and the terminal may include more or fewer components than those shown in the figure, or some components may be combined, or a different component deployment may be used.

Figure 15:
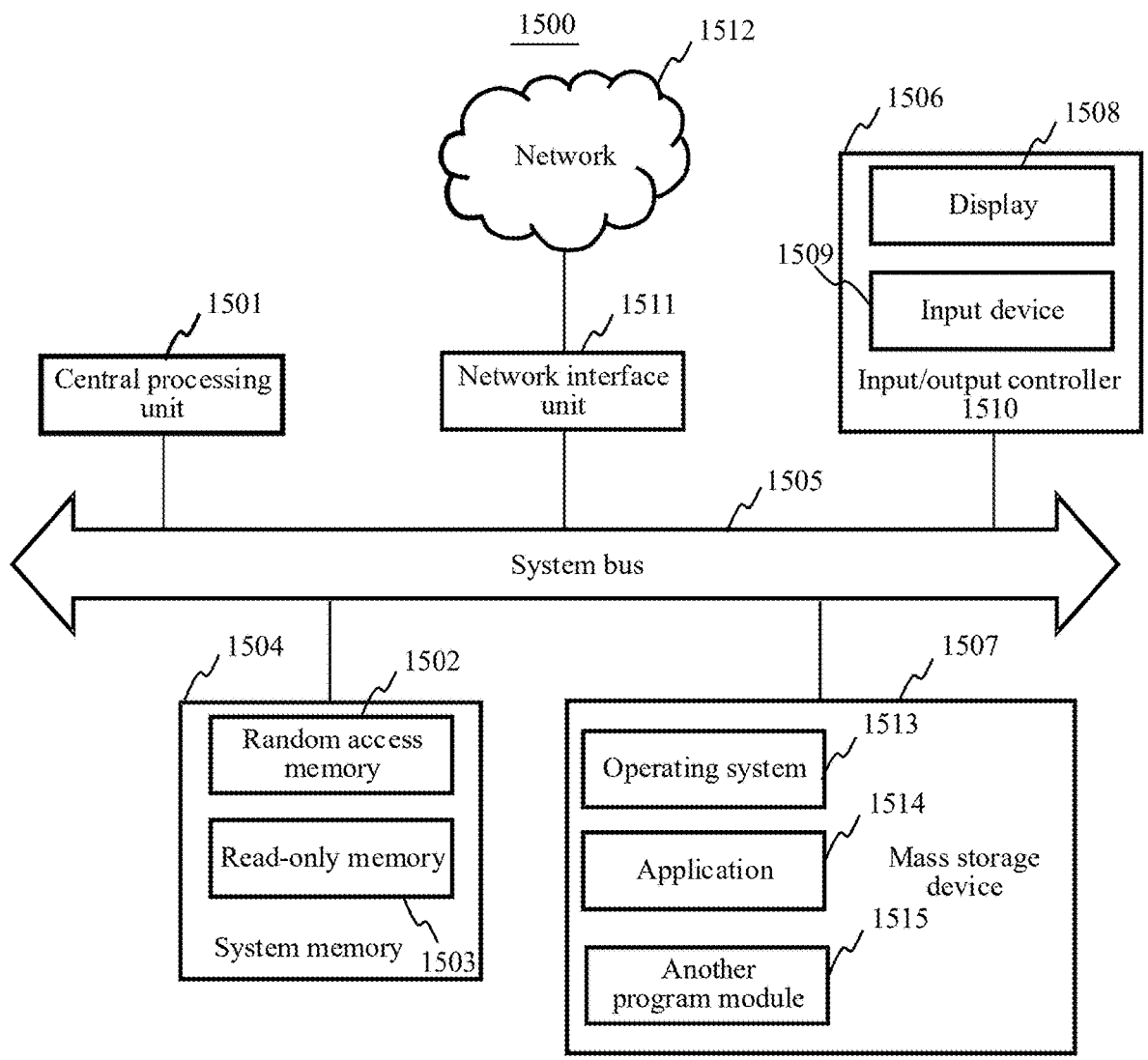
FIG. 15 is a schematic structural diagram of a server according to an embodiment of this application.

FIG. 15 is a schematic structural diagram of a server according to an embodiment of this application. The server may be configured to implement virtual item packet processing method performed by the server provided in the foregoing embodiments. A server 1500 includes a central processing unit (CPU) 1501, a random access memory (RAM) 1502, a system memory 1504 of a read only memory (ROM) 1503, and a system bus 1505 connecting the system memory 1504 to the CPU 1501. The server 1500 further includes a basic input/output (I/O) system 1506 assisting in transmitting information between devices in a computer, and a mass storage device 1507 configured to store an operating system 1513, an application program 1514 and another program module 1515.

The basic I/O system 1506 includes a display 1508 configured to display information and an input device 1509 such as a mouse or a keyboard that is configured to allow a user to input information. The display 1508 and the input device 1509 are both connected to the CPU 1501 by using an input/output controller 1510 connected to the system bus 1505. The basic I/O system 1506 may further include the input/output controller 1510, to receive and process inputs from a plurality of other devices, such as the keyboard, the mouse, or an electronic stylus. Similarly, the I/O controller 1510 further provides an output to a display screen, a printer, or another type of output device.

According to various embodiments of this application, the server 1500 may further be connected, by using a network such as the Internet, to a remote computer on the network and run. That is, the server 1500 may be connected to a network 1512 by using a network interface unit 1511 connected to the system bus 1505, or may be connected to another type of network or a remote computer system (not shown) by using a network interface unit 1511.

The memory further includes one or more programs. The one or more programs are stored in the memory and configured to be executed by one or more CPUs 1501. The one or more programs include instructions for performing an information processing operation provided in the foregoing embodiments.

This application further provides a computer device, including a processor and a memory, the memory storing at least one instruction, at least one program, a code set or an instruction set, the at least one instruction, the at least one program, the code set or the instruction set being loaded and executed by the processor to implement the foregoing information processing method according to any of the foregoing embodiments.

This application further provides a computer-readable storage medium, storing at least one instruction, at least one program, a code set, or an instruction set, the at least one instruction, the at least one program, the code set, or the instruction set being loaded and executed by a processor to implement the information processing method according to any of the foregoing embodiments.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the information processing method provided in the foregoing implementations.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. An information processing method, performed by a computer device, the method comprising:
   displaying a user interface, the user interface comprising a received virtual item packet, and the virtual item packet comprising topic information;
   displaying the topic information of the virtual item packet;
   receiving an interaction message corresponding to a second user account, the interaction message being matched with target information to request to receive a virtual item in the virtual item packet, and the target information being the topic information or information associated with the topic information; and
   receiving the virtual item in the virtual item packet in response to matching the interaction message and the target information, comprising:
   determining a topic space model corresponding to the topic information;
   determining a degree of matching between the interaction message and the target information according to a cosine value between the interaction message and the topic space model; and
   receiving the virtual item in the virtual item packet when the degree of matching is greater than a first threshold.

2. The method according to claim 1, wherein the topic space model comprises at least two pieces of entry point information corresponding to the topic information, the at least two pieces of entry point information are used for describing different aspects of the topic information, the entry point information corresponds to n preset corpora, and n is a positive integer; and
   the determining the degree of matching between the interaction message and the target information according to the cosine value between the interaction message and the topic space model comprises:
   mapping the interaction message to a vector space to obtain an interaction message vector;
   determining an $i^{th}$ cosine value between the interaction message vector and a preset corpus vector corresponding to an $i^{th}$ preset corpus, wherein i is a positive integer;
   determining the largest $i^{th}$ cosine value as the cosine value between the interaction message and the topic space model; and
   determining the degree of matching according to the cosine value.

3. The method according to claim 2, wherein a number of the virtual items in the virtual item packet is positively correlated to the degree of matching.

4. The method according to claim 1, wherein the receiving the virtual item in the virtual item packet in response to matching the interaction message and the target information further comprises:
   extracting a keyword in the interaction message;
   obtaining a preset topic list corresponding to the keyword;
   determining that the interaction message is matched with the target information when a topic in the topic information is in the preset topic list; and
   receiving the virtual item in the virtual item packet in response to determining that the interaction message is matched with the target information.

5. The method according to claim 1, the method further comprising:
recognizing an emotional attribute of the interaction message; and
detecting whether the interaction message is matched with the target information when the emotional attribute belongs to a positive emotion.

6. The method according to claim 1, wherein the displaying the topic information of the virtual item packet comprises:
displaying a receiving pop-up window in response to a receiving operation on the virtual item packet, wherein the receiving pop-up window comprises the topic information of the virtual item packet and a first input interface of the interaction message; and
the receiving the interaction message corresponding to the second user account comprises:
receiving the interaction message through the first input interface.

7. The method according to claim 1, wherein the displaying topic information of the virtual item packet comprises:
displaying the topic information on the virtual item packet displayed on the user interface; and
the receiving the interaction message corresponding to the second user account comprises:
receiving the interaction message through a second input interface on the user interface.

8. The method according to claim 7, wherein the receiving the interaction message through the second input interface on the user interface comprises:
receiving a candidate message corresponding to the second user account through the second input interface on the user interface; and
using the candidate message as the interaction message when:
a time interval between a time at which the candidate message is displayed and a time at which the virtual item packet is displayed is less than a second threshold; or
a number of messages spaced between the candidate message and the virtual item packet are less than a third threshold; or
the candidate message comprises a response identifier, and the response identifier identifying that the candidate message is the interaction message.

9. The method according to claim 1, wherein the received virtual item in the virtual item packet is transmitted by a server in a case of detecting that the interaction message is matched with the target information.

10. An information processing method, performed by a computer device, the method comprising:
obtaining topic information corresponding to a virtual item packet;
obtaining parameter information corresponding to the virtual item packet, the virtual item packet carrying a virtual item; and
displaying a virtual item packet transmitted by a first user account, the virtual item packet being generated according to the topic information and the parameter information, and the virtual item packet comprising the topic information,
wherein the obtaining the topic information corresponding to the virtual item packet comprises:
displaying a candidate topic information list that comprises candidate topic information; and receiving a selection operation on target topic information in the candidate topic information list, and using the target topic information as the topic information corresponding to the virtual item packet; or
displaying an editing control; and determining the topic information according to an editing operation on the editing control.

11. The method according to claim 10, further comprising:
displaying an interaction message corresponding to a second user account, wherein
the interaction message is matched with target information to request to receive the virtual item in the virtual item packet, and the target information is the topic information or information associated with the topic information.

12. An information processing method, comprising:
receiving, by a server, a virtual item packet transmission request from a first client, a first user account being logged in to the first client;
transmitting, by the server, a virtual item packet to a second client according to the virtual item packet transmission request, the virtual item packet comprising topic information;
obtaining, by the server, an interaction message corresponding to a second user account, the second user account being an account logged in to the second client; and
transmitting, by the server, a virtual item in the virtual item packet to the second client in response to matching the interaction message and target information, the target information being the topic information or information associated with the topic information, comprising:
determining a topic space model corresponding to the topic information;
determining a degree of matching between the interaction message and the target information according to a cosine value between the interaction message and the topic space model; and
transmitting the virtual item in the virtual item packet to the second client when the degree of matching is greater than a first threshold.

13. The method according to claim 12, wherein the obtaining, by the server, the interaction message corresponding to the second user account comprises:
receiving a recognition request from the second client, wherein the recognition request carries the interaction message, and the recognition request is used for requesting the server to perform recognition on whether the interaction message is matched with the target information.

14. The method according to claim 12, wherein the topic space model comprises at least two pieces of entry point information corresponding to the topic information, the at least two pieces of entry point information are used for describing different aspects of the topic information, the entry point information corresponds to n preset corpora, and n is a positive integer; and
the determining the degree of matching between the interaction message and the target information according to the cosine value between the interaction message and the topic space model comprises:
mapping the interaction message to a vector space to obtain an interaction message vector;
determining an $i^{th}$ cosine value between the interaction message vector and a preset corpus vector corresponding to an $i^{th}$ preset corpus, wherein i is a positive integer;

determining the largest $i^{th}$ cosine value as the cosine value between the interaction message and the topic space model; and determining the degree of matching according to the cosine value.

15. The method according to claim 14, wherein a number of the virtual items in the virtual item packet is positively correlated to the degree of matching.

16. The method according to claim 12, wherein the transmitting the virtual item in the virtual item packet to the second client in response to matching the interaction message and the target information further comprises:

extracting a keyword in the interaction message;

obtaining a preset topic list corresponding to the keyword;

determining that the interaction message is matched with the target information when a topic in the topic information is in the preset topic list; and transmitting the virtual item in the virtual item packet to the second client in response to determining that the interaction message is matched with the target information.

17. A non-transitory computer-readable storage medium, storing computer programs, the computer programs, when being loaded and executed by at least one processor, causing the at least one processor to implement the information processing method according to claim 1.

18. A non-transitory computer-readable storage medium, storing computer programs, the computer programs, when being loaded and executed by at least one processor, causing the at least one processor to implement the information processing method according to claim 10.

19. A non-transitory computer-readable storage medium, storing computer programs, the computer programs, when being loaded and executed by at least one processor, causing the at least one processor to implement the information processing method according to claim 12.

* * * * *